United States Patent
Gao et al.

(10) Patent No.: US 10,212,471 B2
(45) Date of Patent: Feb. 19, 2019

(54) METHOD FOR CONTROLLING MULTIPLE SUBSCREENS ON DISPLAY DEVICE AND DISPLAY DEVICE THEREFOR

(71) Applicant: SAMSUNG ELECTRONICS CO., LTD., Suwon-si (KR)

(72) Inventors: Qiang Gao, Beijing (CN); Jinlong Zhu, Beijing (CN); Huayong Xu, Beijing (CN); Hongbo Wan, Beijing (CN); Zhenhua Qu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/029,195

(22) PCT Filed: Oct. 28, 2014

(86) PCT No.: PCT/KR2014/010196
§ 371 (c)(1),
(2) Date: Apr. 13, 2016

(87) PCT Pub. No.: WO2015/065018
PCT Pub. Date: May 7, 2015

(65) Prior Publication Data
US 2016/0241905 A1    Aug. 18, 2016

(30) Foreign Application Priority Data
Oct. 28, 2013   (CN) .......................... 2013 1 0515639

(51) Int. Cl.
*H04N 21/431*    (2011.01)
*G06F 3/14*    (2006.01)
(Continued)

(52) U.S. Cl.
CPC ....... *H04N 21/4316* (2013.01); *G06F 3/0482* (2013.01); *G06F 3/04812* (2013.01);
(Continued)

(58) Field of Classification Search
CPC .. G06F 3/04812; G06F 3/0482; G06F 3/1431; H04N 5/45; H04N 21/4314; H04N 21/4782; H04N 21/485; H04N 21/4858
See application file for complete search history.

(56) References Cited

U.S. PATENT DOCUMENTS 5,867,227 A * 2/1999 Yamaguchi .............. H04N 5/45
348/565
6,396,480 B1   5/2002 Schindler et al.
(Continued)

FOREIGN PATENT DOCUMENTS

CN    1811764 A    8/2006
CN    101583019 A    11/2009
(Continued)

OTHER PUBLICATIONS

Communication dated Jan. 23, 2015 issued by the International Searching Authority in counterpart International Application No. PCT/KR2014/010196 (PCT/ISA/210).
(Continued)

*Primary Examiner* — Samira Monshi
(74) *Attorney, Agent, or Firm* — Sughrue Mion, PLLC

(57) ABSTRACT

Provided is a method of displaying and controlling a plurality of sub-screens on a display apparatus. A plurality of sub-screens of a preset number are displayed on a screen of the display apparatus, and the sub-screens are respectively bound to different input devices, and a control instruction sent from the input devices to the display apparatus independently controls only a sub-screen bound to a particular input device, and does not affect other sub-screens that are not bound to the particular input device. A user of a display may use various services at the same time via the plurality of independent sub-screens displayed on the screen of the display apparatus, and a plurality of users may share a large
(Continued)

screen of the display apparatus and view respectively desired content at the same time.

21 Claims, 20 Drawing Sheets

(51) Int. Cl.
| | | |
|---|---|---|
| *H04N 5/445* | (2011.01) | |
| *H04N 21/4782* | (2011.01) | |
| *H04N 21/485* | (2011.01) | |
| *G06F 3/0481* | (2013.01) | |
| *G06F 3/0482* | (2013.01) | |
| *G06F 3/0484* | (2013.01) | |
| *H04N 5/45* | (2011.01) | |
| *G09G 5/14* | (2006.01) | |
| *H04N 21/422* | (2011.01) | |

(52) U.S. Cl.
CPC ........ *G06F 3/04842* (2013.01); *G06F 3/1431* (2013.01); *H04N 5/44543* (2013.01); *H04N 5/44591* (2013.01); *H04N 5/45* (2013.01); *H04N 21/4314* (2013.01); *H04N 21/4782* (2013.01); *H04N 21/485* (2013.01); *H04N 21/4858* (2013.01); *G09G 5/14* (2013.01); *G09G 2370/027* (2013.01); *H04N 21/422* (2013.01)

(56) References Cited

U.S. PATENT DOCUMENTS

| | | | | |
|---|---|---|---|---|
| 7,394,450 | B2* | 7/2008 | Shibamiya | H04N 5/4403 345/156 |
| 7,712,041 | B2* | 5/2010 | Toyama | G06F 3/038 715/751 |
| 9,456,169 | B2 | 9/2016 | Wang et al. | |
| 2004/0008221 | A1 | 1/2004 | O'Neal et al. | |
| 2004/0095316 | A1 | 5/2004 | Shibamiya et al. | |
| 2007/0150924 | A1* | 6/2007 | Ichinose | G06F 3/0481 725/78 |
| 2007/0236453 | A1* | 10/2007 | Maynard | G06F 17/2211 345/158 |
| 2009/0288039 | A1 | 11/2009 | Mail et al. | |
| 2010/0188579 | A1* | 7/2010 | Friedman | H04N 5/45 348/565 |
| 2012/0299815 | A1* | 11/2012 | Kim | H04N 21/4126 345/156 |
| 2015/0121304 | A1 | 4/2015 | Hwang et al. | |

FOREIGN PATENT DOCUMENTS

| | | |
|---|---|---|
| CN | 102129345 A | 7/2011 |
| CN | 102271286 A | 12/2011 |
| CN | 102905183 A | 1/2013 |
| EP | 2439925 A1 | 4/2012 |
| JP | 2001-061110 A | 3/2001 |
| JP | 2008-79077 A | 4/2008 |
| JP | 2008-167100 A | 7/2008 |
| JP | 2009-140473 A | 6/2009 |
| JP | 2013-102807 A | 5/2013 |
| JP | 2013-179553 A | 9/2013 |
| KR | 10-2006-0055460 A | 5/2006 |
| KR | 10-2008-0039642 A | 5/2008 |
| KR | 10-2013-0113054 A | 10/2013 |
| KR | 10-1335842 B1 | 12/2013 |

OTHER PUBLICATIONS

Communication dated Feb. 3, 2016 issued by the State Intellectual Property Office of P.R. China in counterpart Chinese Patent Application No. 201310515639.9.

Communication dated Aug. 4, 2016 issued by the State Intellectual Property Office of P.R. China in counterpart Chinese Patent Application No. 201310515639.9.

Communication dated Nov. 1, 2016 issued by the State Intellectual Property Office of P.R. China in counterpart Chinese Patent Application No. 201310515639.9.

Communication dated Mar. 28, 2017, issued by the European Patent Office in counterpart European application No. 14857493.2.

Communication dated Apr. 6, 2017, issued by the European Patent Office in counterpart European application No. 14857493.2.

Communication dated Sep. 20, 2017 issued by the State Intellectual Property Office of People's Republic China in counterpart Chinese Patent Application No. 201310515639.9.

* cited by examiner

FIG. 18
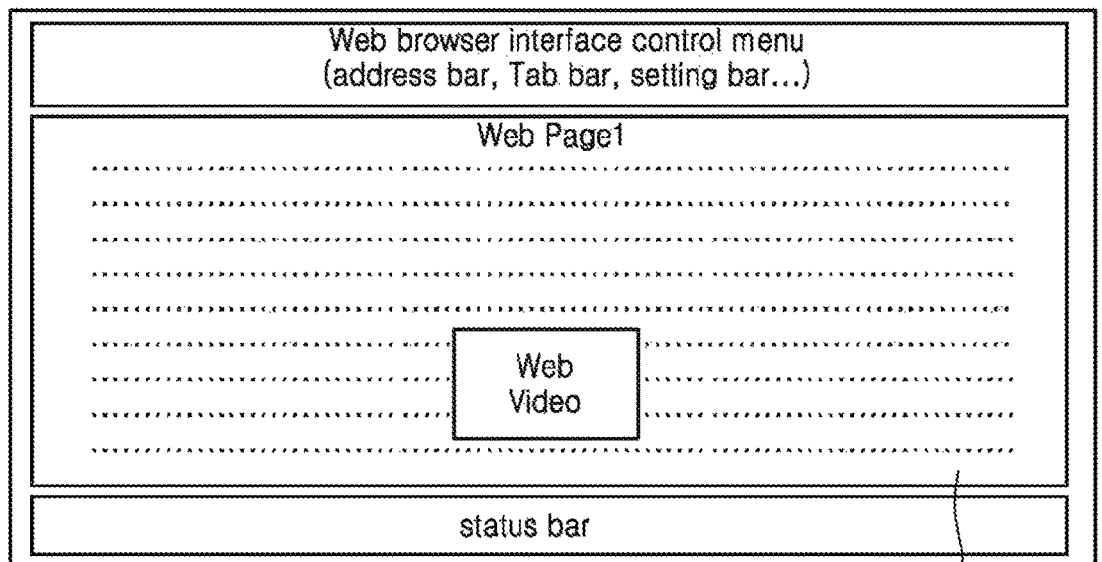
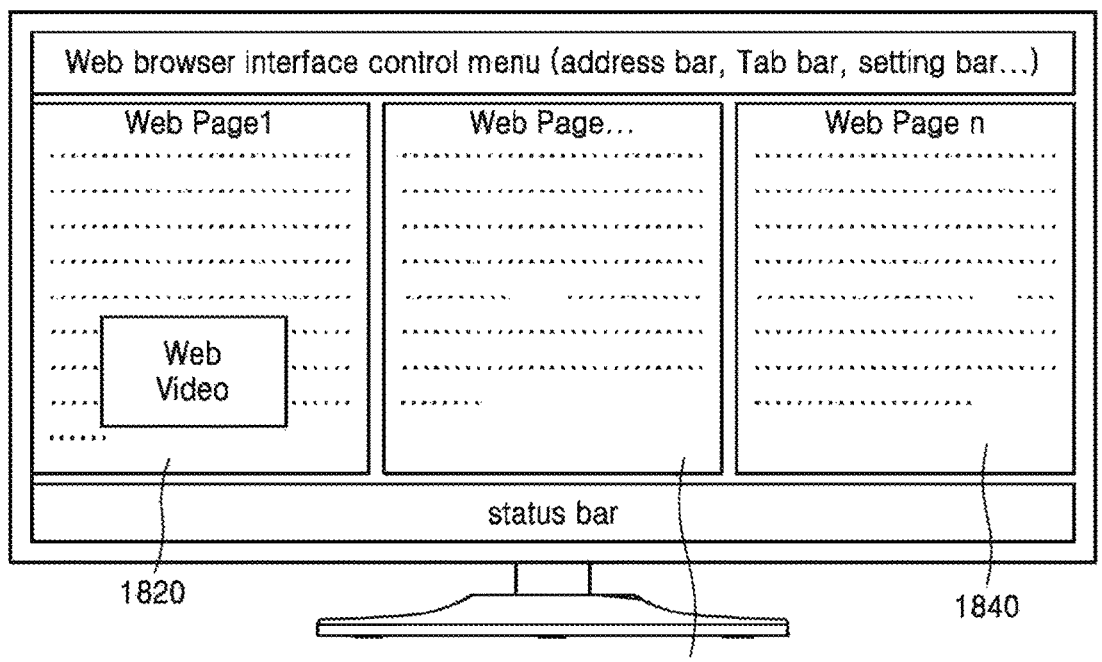

METHOD FOR CONTROLLING MULTIPLE SUBSCREENS ON DISPLAY DEVICE AND DISPLAY DEVICE THEREFOR

CROSS REFERENCE TO RELATED APPLICATIONS

This is a National Stage entry of International Application No. PCT/KR2014/010196 filed Oct. 28, 2014, which claims priority of Chinese Patent Application No. 201310515639.9 filed Oct. 28, 2013, the contents of all of which are incorporated herein by reference in their entirety.

TECHNICAL FIELD

The inventive concept relates to a method of controlling a plurality of sub-screens displayed on a display apparatus, and more particularly, to a method of controlling a plurality of sub-screens via a plurality of input devices connected to the display apparatus.

BACKGROUND ART

As manufacturing technology for displays is developed, screen sizes of display apparatuses are increasing. The right for controlling a screen of a display apparatus is usually given to one user, and it is difficult for multiple users to share and use one display apparatus at the same time. However, such a condition is not efficient considering such a large screen of the display apparatus. In particular, besides the function of displaying broadcast content, although a smart television (TV) may execute various applications such as a web browsing application, a game application or the like, only one service (for example, broadcast content or a web browser) is provided at a time on a screen of the smart TV, and thus, capabilities of the smart TV are not sufficiently utilized.

DETAILED DESCRIPTION OF THE INVENTION

Technical Problem

The inventive concept provides a method of controlling a screen of a display apparatus, whereby multiple users are allowed to use respectively desired services at the same time via one display apparatus.

TECHNICAL SOLUTION

According to embodiments of the inventive concept, a screen of a display apparatus is divided into a plurality of sub-screens, and the sub-screens are respectively bound to different input devices so that the sub-screens are independently controlled of One Another Via Different Input Devices.

Advantageous Effects

A user may receive various services via one display apparatus, and a plurality of users may independently use respectively desired services via the single display apparatus at the same time.

DESCRIPTION OF THE DRAWINGS

FIG. 18 is a view illustrating a method of converting a display mode between a multi-screen mode and a tab mode on a PC style web browser executed on a smart TV, according to an embodiment of the inventive concept;

BEST MODE

Figure 1:
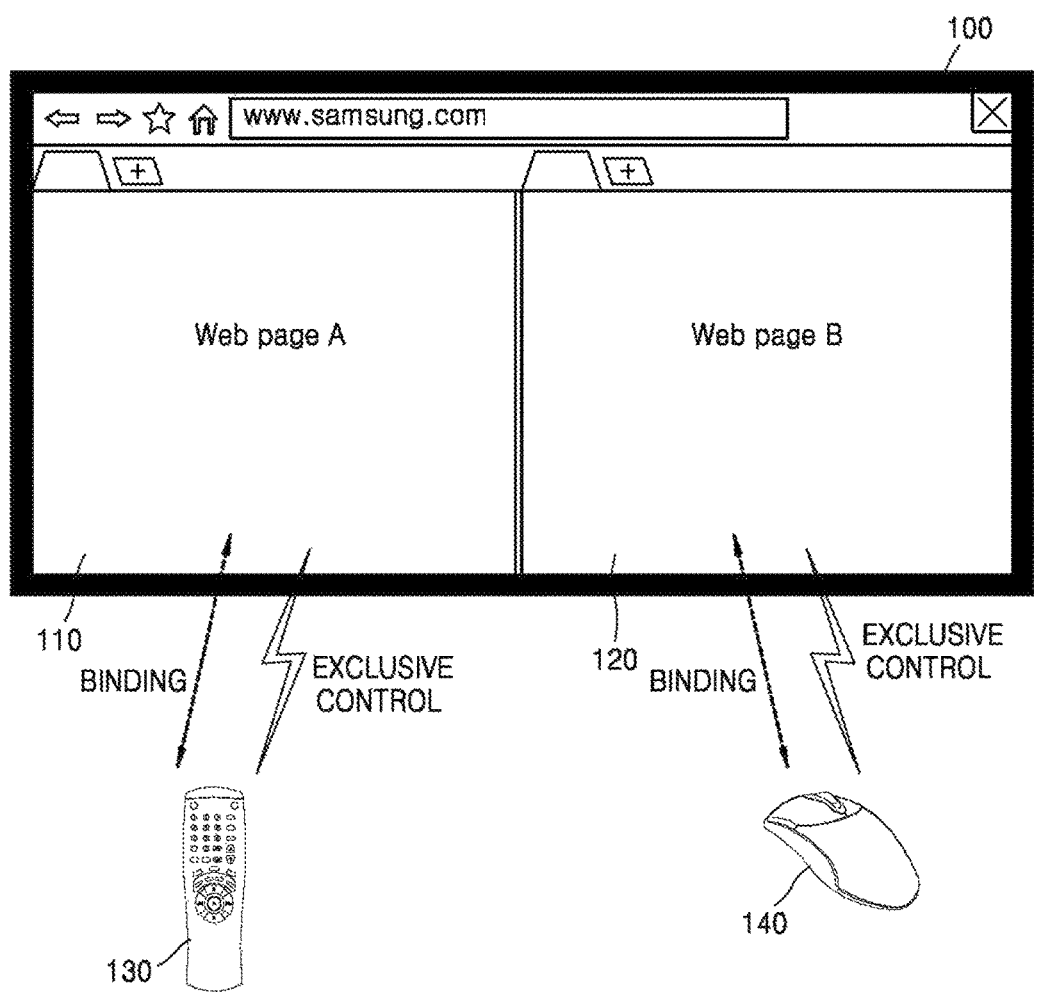
FIG. 1 is a conceptual diagram illustrating a method of controlling sub-screens according to an embodiment of the inventive concept.

According to an aspect of the inventive concept, there is provided a method of controlling a screen, the method including: binding each of a plurality of sub-screens displayed on a screen of a display apparatus to at least one of input devices communicable with the display apparatus; in response to receiving a control instruction with respect to the display apparatus, determining a target sub-screen that is bound to an input device that has transmitted the control instruction, from among the plurality of sub-screens; and performing the control instruction on the determined target sub-screen, independently of other sub-screens.

The binding may include: displaying a list of input devices communicable with the display apparatus with respect to each of a plurality of sub-screens which are generated by splitting a web page display interface of a web browser executed on the display apparatus; receiving a user input to select at least one input device from the list; and setting the input device selected by the user input, as an input device having an exclusive control over the corresponding sub-screen.

The method may further include displaying a menu for setting the number of sub-screens, wherein the number of sub-screens is determined according to a user input received via the menu.

The determining of the target sub-screen comprises, when a plurality of sub-screens are bound to the input device, determining, as a target sub-screen, a sub-screen, on which an identifier cursor, which indicates a location to which a command from the input device is to be input within a screen of the display apparatus, is located.

The method may further include, when a plurality of sub-screens are bound to the input device, performing, according to a user input from the input device, conversion between a multi-screen mode displaying all of the sub-screens bound to the input device and a tab mode displaying content of only one of corresponding sub-screens on a single screen having a size corresponding to a sum of the sub-screens bound to the input device.

The method may further include: binding a television (TV) picture in picture (PIP) window displaying broadcast content, to an input device selected by a user from among input devices connected to the display apparatus; and controlling the TV PIP window independently of the plurality of sub-screens according to a control instruction from the selected input device, wherein the TV PIP window is displayed in front of the plurality of sub-screens.

The controlling of the TV PIP window may include changing a size or a location of the TV PIP window according to a user input of dragging the TV PIP window.

An identifier cursor indicating a location to which a command of the input device is to be input within a screen of the display apparatus, may be displayed only within a sub-screen bound to the input device, and is not displayed in a sub-screen not bound to the input device.

The plurality of sub-screens may independently display execution screens of different applications from one another.

According to an aspect of the inventive concept, there is provided a non-transitory computer-readable recording medium having recorded thereon a program for executing the method described above.

According to an aspect of the inventive concept, there is provided a display apparatus including: a display configured to display a plurality of sub-screens; at least one memory configured to store a program controlling the plurality of screens; and a controller configured to execute the program stored in the at least one memory, wherein the at least one program includes instructions for executing operations including: binding each of the plurality of sub-screens displayed on the display to at least one of input devices communicable with the display apparatus; in response to receiving a control instruction from the outside, determining a target sub-screen bound to an input device that has transmitted the control instruction from among the plurality of sub-screens; and performing the control instruction on the determined target sub-screen independently of other sub-screens.

The instructions for executing the operation of binding may include instructions for executing operations including: displaying a list of input devices connected to the display apparatus with respect to each of a plurality of sub-screens generated by splitting a web page display interface of a web browser executed on the display apparatus; receiving a user input to select at least one input device from the list; and setting an input device selected according to the user input, as an input device having an exclusive control over the corresponding sub-screen.

The program may further include instructions for executing an operation of displaying a menu for setting the number of sub-screens, wherein the number of sub-screens is determined according to a user input received via the menu.

The instructions for executing the operation of determining the target sub-screen may include, when a plurality of sub-screens are bound to the input device, instructions for executing an operation of determining, as a target sub-screen, a sub-screen, on which an identifier cursor indicating a location to which a command of the input device is to be input within a screen of the display apparatus, is located.

The program may further include, when a plurality of sub-screens are bound to the input device, instructions for executing an operation of performing, according to a user input via the input device, conversion between a multi-screen mode displaying all of the sub-screens bound to the input device and a tab mode displaying content of only one of corresponding sub-screens by using a single screen having a size corresponding to a sum of the sub-screens bound to the input device.

The program may further include instructions for executing operations including: binding a television (TV) picture in picture (PIP) window displaying broadcast content, to an input device selected by a user from among the input devices connected to the display apparatus; and controlling the TV PIP window independently of the plurality of sub-screens according to a control instruction from the selected input device, wherein the TV PIP window is displayed in front of the plurality of sub-screens.

The instructions for executing the operation of controlling the TV PIP window may include changing a size or a location of the TV PIP window according to a user input of dragging the TV PIP window.

An identifier cursor, which is an indicator indicating a location to which a command of the input device is to be input within a screen of the display apparatus, may be displayed only within a sub-screen bound to the input device, and is not displayed in a sub-screen not bound to the input device.

The plurality of sub-screens may independently display execution screens of different applications from one another.

Mode of the Invention

The embodiments of the inventive concept now will be described more fully hereinafter with reference to the accompanying drawings. Also, various embodiments of the inventive concept now will be described more fully with reference to the accompanying drawings. Like reference numerals or symbols in the drawings refer to like components or elements performing substantially the same function.

Hereinafter, a display apparatus should be understood as a broad concept including all of apparatuses capable of providing visual content controlled by a user, such as an analog television (TV), a digital TV, a smart TV or an all-in-one personal computer (PC).

FIG. 1 is a conceptual diagram illustrating a method of controlling sub-screens according to an embodiment of the inventive concept.

As illustrated in FIG. 1, two sub-screens 110 and 120 are displayed on a screen of a display apparatus 100. The sub-screens are generated by splitting a web page display interface of a web browser executed on a display apparatus into two.

Currently, the display apparatus 100 is connected to two input devices 130 and 140, and the input devices 130 and 140 are each 'bound' to a sub-screen. When an input device and a sub-screen are bound to each other, the input device has an exclusive control right with respect to the sub-screen bound to the input device, independently of other sub-screens. As illustrated in FIG. 1, a remote controller 130 is bound to the left sub-screen 110, and a mouse 140 is bound to the right sub-screen 120, and thus, the right sub-screen 120 is not affected by a control instruction of the remote controller 130 with respect to the left sub-screen 110, and vice versa. For example, even when a user of the remote controller 130 transmits a control instruction via the remote controller 130 to scroll a web page A or input text or access another web page, the control instruction does not affect a web page B displayed on the right sub-screen 120 at all. This is because the right sub-screen 120 is bound to the mouse 140.

While two sub-screens are assumed in the present embodiment, the number of sub-screens is not limited thereto, and the number of sub-screens may be varied according to implementation methods.

Meanwhile, while FIG. 1 illustrates a typical web browser including control bars having menus such as an address window, a back button, a forward button, an add favorite menu, etc., the embodiments are not limited to the format of the web browser. When a screen of a display apparatus is split according to the inventive concept, spaces for sub-screens may have to be utilized even more efficiently, and thus, a new web browser user interface may be defined. For example, by not displaying a control bar on a web browser, space that is previously occupied by a control bar may be used as a web page display interface.

Furthermore, sub-screens are generated not only by splitting a web page display interface of a web browser, and the sub-screens may be respectively execution screens of different applications. For example, when two sub-screens are displayed, one sub-screen may display a web browser, and the other sub-screen may display a game application. In this case, while one user browses web content via the web browser, at the same time, the other user may enjoy a game via the game application.

As described above, according to the inventive concept, a plurality of sub-screens may be displayed on a display apparatus, and are respectively bound to different input devices from one another so that a plurality of users may use simultaneously and independently services provided via the display apparatus on the single display apparatus.

Figure 2:
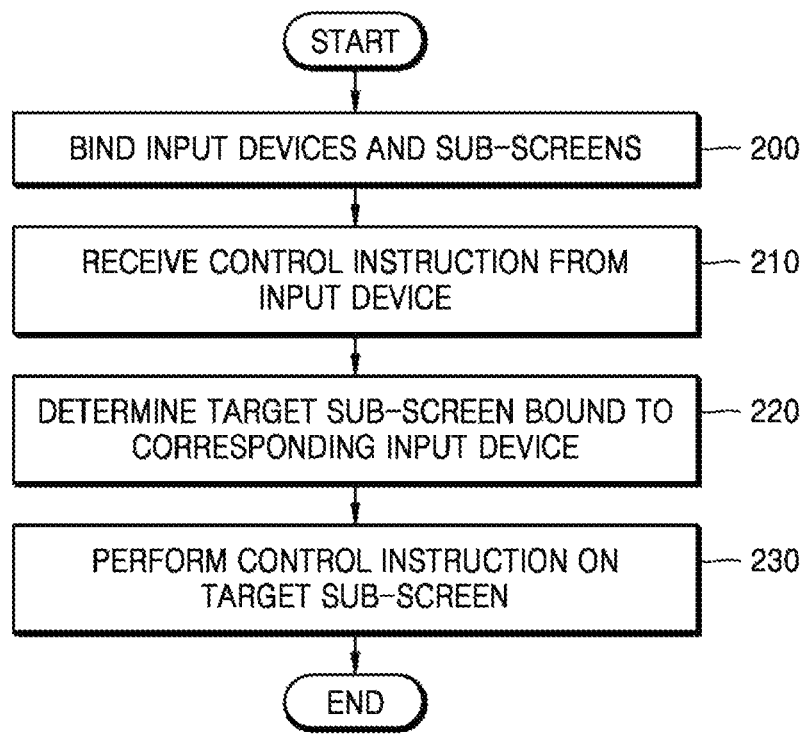
FIG. 2 is a flowchart of processes of controlling sub-screens according to an embodiment of the inventive concept.

FIG. 2 is a flowchart of processes of controlling sub-screens according to an embodiment of the inventive concept.

In operation 200, a plurality of sub-screens displayed on a display apparatus are bound to input devices. Two or more input devices may be bound to one sub-screen. For example, one sub-screen may be bound to a mouse and a keyboard to increase user manipulation convenience. On the contrary, one input device may be bound to a plurality of sub-screens. For example, one user may replay a web video via one sub-screen, and at the same time, read a news article via another sub-screen. However, in this case, only one sub-screen may be preferably controlled when the user manipulates an input device. This case will be described in detail later with reference to FIG. 6.

In addition, an operation of binding input devices and sub-screens will be described in detail later with reference to FIG. 3.

In operation 210, the display apparatus receives a control instruction from one of the plurality of input devices connected to the display apparatus. For example, when the user presses an arrow button of a remote controller or turns a mouse wheel upwards, a control instruction corresponding to such manipulation of the input device may be transmitted to the display apparatus via a communication channel set between the input device and the display apparatus.

In operation 220, from among the plurality of sub-screens displayed on the display apparatus, a sub-screen bound to the input device that has transmitted the control instruction in operation 210, that is a target sub-screen, is determined. If a plurality of sub-screens are bound to the input device that has transmitted a control instruction, a sub-screen, on which an identifier cursor of the control device is currently located, may be determined as a target sub-screen. The identifier cursor is an indicator indicating a location to which an instruction of an input device is to be input within a screen of the display apparatus, and refers to not only a typical pointing cursor used by a mouse but also a cursor used in a text input window, or a cursor used to select a blockwise object, or the like.

In operation 230, from among the sub-screens displayed on a display apparatus, the control instruction transmitted by the input device to the target sub-screen determined in operation 220 is performed. Other sub-screens besides the target sub-screen are not affected by the control instruction at all.

Figure 3:
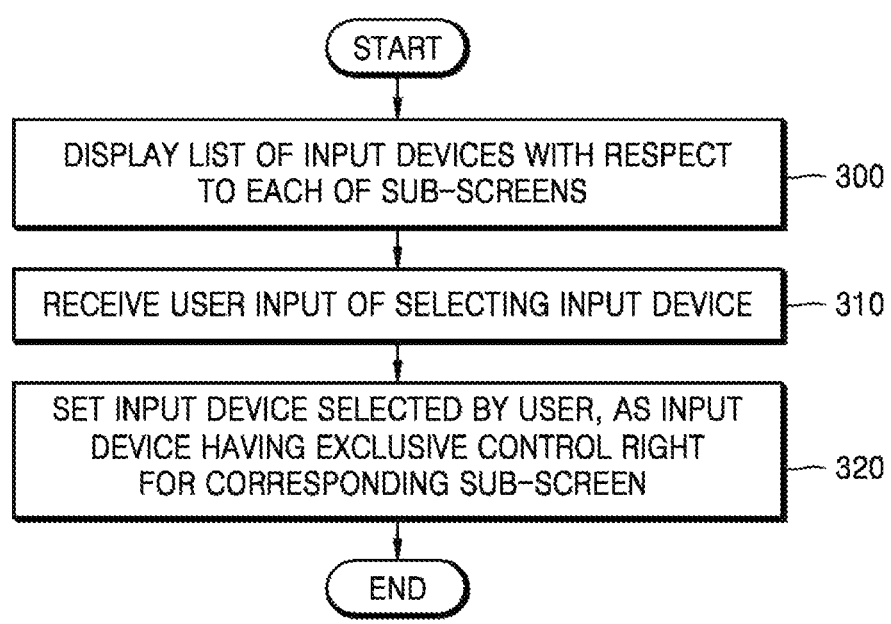
FIG. 3 is a flowchart of an operation of binding sub-screens to input devices, according to an embodiment of the inventive concept.

FIG. 3 is a flowchart of an operation of binding sub-screens to input devices, according to an embodiment of the inventive concept.

In operation 300, a display apparatus shows to a user a list of input devices that may be bound to sub-screens. That is, the list of input devices connected to the display apparatus is shown on a screen of the display apparatus. The display apparatus and the input devices may be connected via various communication protocols such as Bluetooth, Wi-Fi Direct, or the like, and a communication protocol required to implement the inventive concept is not limited to a particular one.

In operation 310, the user selects at least one input device via an input device that is designated as default in the display apparatus from the list of input devices displayed regarding respective sub-screens, and a user input showing the selection is received by the display apparatus.

In operation 320, the input devices that are respectively selected by the user in operation 310 with respect to the respective sub-screens are set as input devices having exclusive control right with respect to the respective corresponding sub-screens. In other words, binding between the corresponding sub-screen and the input device selected by the user is completed. Accordingly, the sub-screen is controlled by the input device selected by the user, and is not affected by a control instruction transmitted by other input devices.

As described above, according to the inventive concept, the user himself/herself selects to which input device each sub-screen is to be bound.

Figure 4:
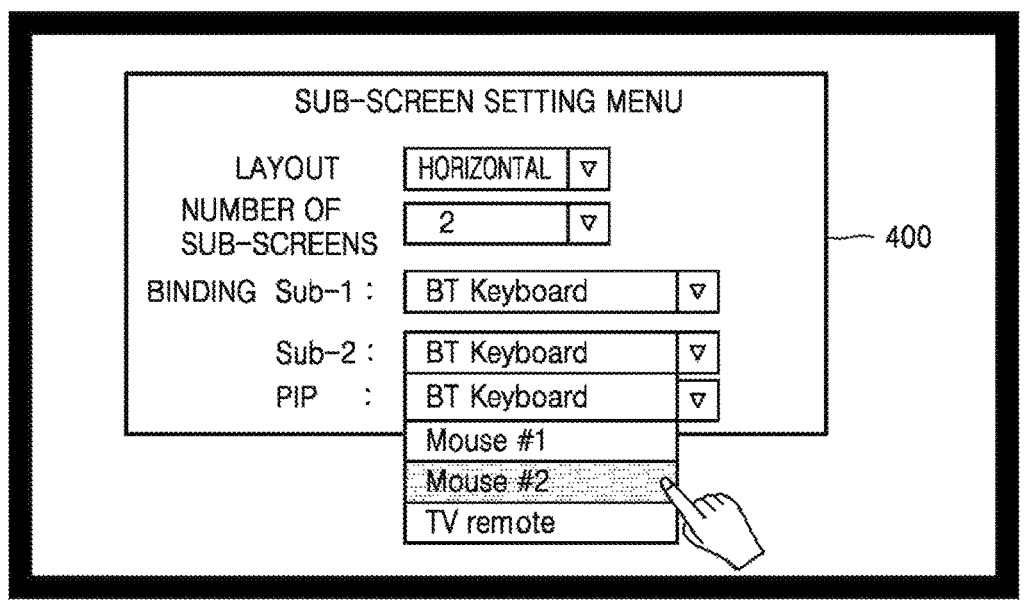
FIG. 4 illustrates a multi-screen setting menu provided to a user to bind sub-screens to input devices, according to an embodiment of the inventive concept.

FIG. 4 illustrates a multi-screen setting menu provided to a user to bind sub-screens to input devices, according to an embodiment of the inventive concept.

A sub-screen setting menu 400 illustrated in FIG. 4 provides a user interface via which a layout, the number of sub-screens, and binding may be set, as a drop-down menu for each item. However, items or menu types set via the sub-screen setting menu 400 are not limited thereto, and may be modified in various manners according to embodiments.

A user may determine whether to arrange sub-screens horizontally or vertically via a layout item.

In addition, the user may appoint the number of sub-screens displayed on a screen of a display apparatus via an item of the number of sub-screens.

The user may appoint an input device to be bound to each sub-screen via an item of binding. As illustrated in FIG. 4, according to the present embodiment, the user has set two sub-screens via the item of the number of sub-screens, and thus, an input device to be bound to each of the two sub-screens may be appointed. In the present embodiment, the user has appointed a Bluetooth keyboard for a first sub-screen, and spread a drop-down menu to select an input device to be bound to a second sub-screen. The drop-down menu shows not only the Bluetooth keyboard that is already bound to the first sub-screen but also a list of all input devices connected to the display apparatus.

If the user selects the input device bound to the first sub-screen again, that is, the Bluetooth keyboard, then all sub-screens are connected to one input device (Bluetooth keyboard), and in this case, one target sub-screen to which a control instruction of the input device is to be applied needs to be determined among the two sub-screens as described above. A sub-screen including an identifier cursor of the input device may be determined as the target sub-screen. This will be described in detail later with reference to FIG. 6.

Meanwhile, the sub-screen setting menu 400 according to the present embodiment allows also a TV picture in picture (PIP) window to be bound to a particular input device via an item 'PIP.' The TV PIP window is also exclusively controlled by an input device that is bound to the TV PIP window like the sub-screens. For example, when the TV PIP window is bound to a remote controller, and when the user presses a channel increase button of the remote controller, other sub-screens are not affected but only a channel of broadcast content displayed on the TV PIP window is changed.

Sizes of the sub-screens do not have to be identical. Thus, although not illustrated in FIG. 4, according to an embodiment, the sub-screen setting menu 400 may provide an item via which sizes of sub-screens may be respectively adjusted.

The sub-screen setting menu 400 may be provided by the display apparatus itself or via an application. For example, according to an embodiment, the sub-screen setting menu 400 may be provided via an operating system (OS) of a smart TV or within a web browser.

Figure 5:
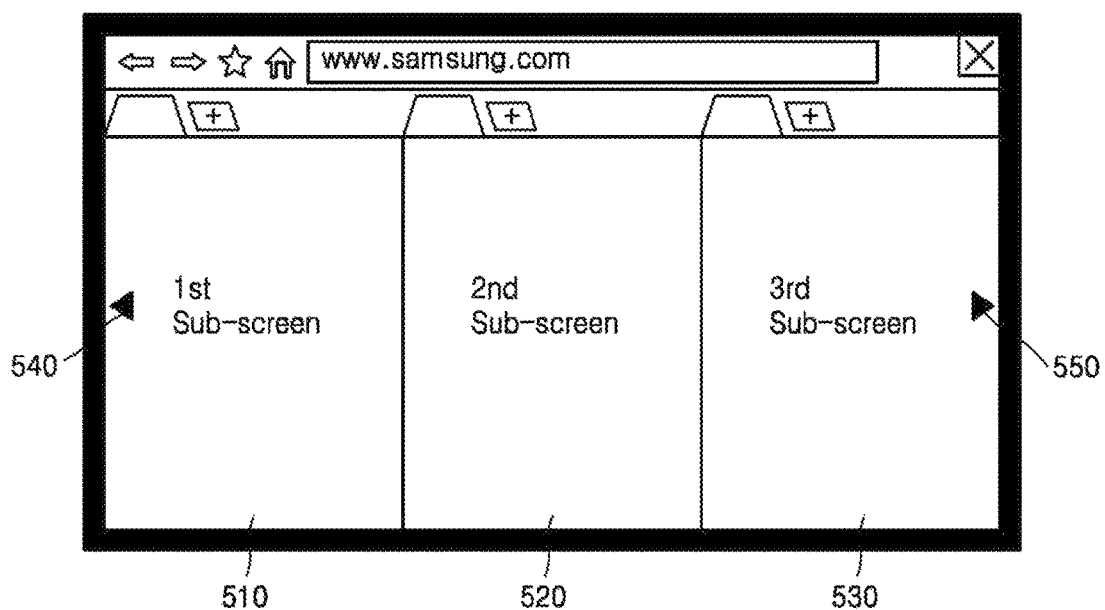
FIG. 5 illustrates a user interface provided by a web browser when the number of sub-screens is set to a threshold value or more, according to an embodiment of the inventive concept.

FIG. 5 illustrates a user interface provided by a web browser when the number of sub-screens is set to a threshold value or more, according to an embodiment of the inventive concept.

As described with reference to FIG. 4, a user may designate the number of sub-screens. However, if too many sub-screens are designated by the user, a size of each sub-screen is decreased in proportion to the number, and readability is also decreased accordingly. Thus, when the number of sub-screens designated by the user is greater than a preset threshold, only sub-screens corresponding to the number of the threshold value are simultaneously displayed on a screen of a display apparatus, and the other sub-screens may be executed on a background. The threshold value may be set by the user according to an embodiment. When a sub-screen is being executed in the background, the user may slide the sub-screens to sequentially call the sub-screens being executed in the background, to the screen of the display apparatus.

FIG. 5 illustrates a sub-screen layout when a threshold value of the number of sub-screens that may be displayed on a screen at a time is three and the user has set the number of sub-screens to four or more. In this case, as illustrated in FIG. 5, only three sub-screens 510, 520, and 530 are displayed on a screen at the same time, and the other sub-screens are executed on a background, and the user may slide the sub-screens to be displayed on the screen, to the left or right, by using slide buttons 540 and 550. For example, when the user selects the right slide button 550, the first sub-screen 510, the second sub-screen 520, and the third sub-screen 530 are slid to the left one by one so that the second sub-screen 520, the third sub-screen 530, and a fourth sub-screen (not shown) are displayed on the screen of the display apparatus as a result.

Figure 6:
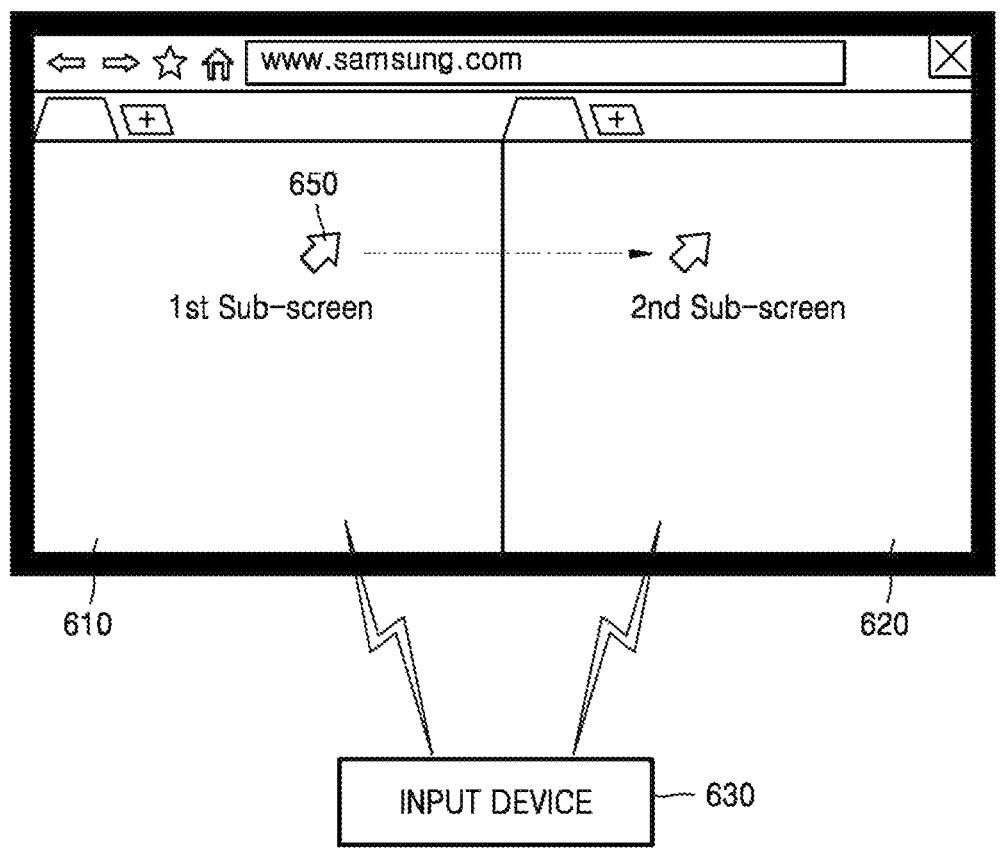
FIG. 6 is a view illustrating a method of controlling sub-screens when a plurality of sub-screens are bound to one input device, according to an embodiment of the inventive concept.

FIG. 6 is a view illustrating a method of controlling sub-screens when a plurality of sub-screens are bound to one input device, according to an embodiment of the inventive concept.

As described above, one input device and a plurality of sub-screens may be bound to each other. In this case, a control instruction sent from the input device has to be performed only with respect to one of the sub-screens bound to the input device, and thus, a mechanism for determining on which of the sub-screens bound to the input device the control instruction is to be performed is required. The control instruction may preferably be applied to a sub-screen including an identifier cursor of the input device, that is, on a sub-screen, on which the identifier cursor is currently located.

In the embodiment illustrated in FIG. 6, two sub-screens 610 and 620 are displayed on the display apparatus, and the sub-screens are both bound to one input device 630. When an identifier cursor 650 of the input device 630 is located within the first sub-screen 610, a control instruction is performed on the first sub-screen 610. When the identifier cursor 650 is located within the second sub-screen 620, the control instruction is performed on the second sub-screen 620. For example, when the user turns a mouse wheel which is the input device 630, and when scrollable web pages are displayed on each of the first sub-screen 610 and the second sub-screen 620, and the pointing cursor 650 of the mouse is within the first sub-screen 610, a web page displayed on the first sub-screen 610 is scrolled, and when the pointing cursor 650 is within the second sub-screen 620, a web page displayed on the second sub-screen 620 is scrolled.

Although not illustrated in FIG. 6, if there is a third sub-screen that is not bound to the input device 630 besides the first sub-screen 610 and the second sub-screen 620, the third sub-screen is not affected at all by manipulation of the input device 630.

Figure 7:
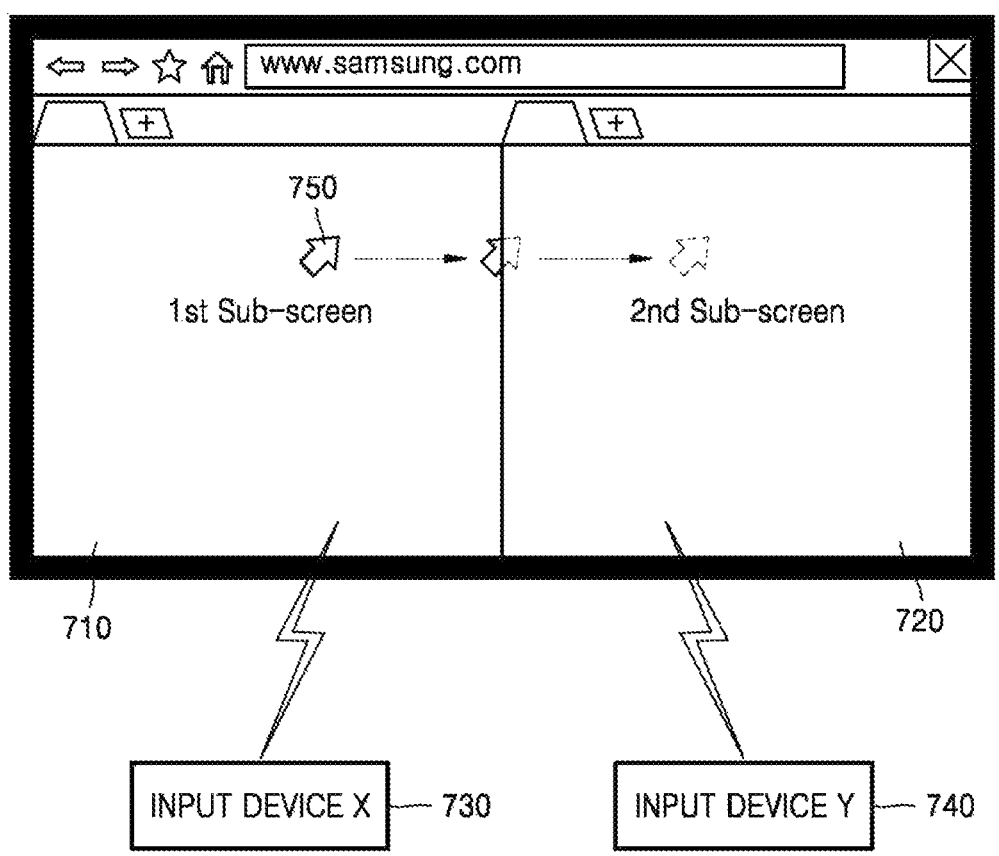
FIG. 7 is a view illustrating a method of controlling sub-screens when a plurality of sub-screens are bound to different input devices from one another, according to an embodiment of the inventive concept.

FIG. 7 is a view illustrating a method of controlling sub-screens when a plurality of sub-screens are bound to different input devices from one another, according to an embodiment of the inventive concept.

As illustrated in FIG. 7, two sub-screens 710 and 720 are displayed on a display apparatus. The first sub-screen 710 is bound to an input device X 730, and the second sub-screen 720 is bound to an input device Y 740. An identifier cursor 750 displayed on a screen of the display apparatus belongs to the input device X 730. Thus, when the user of the input device X 730 manipulates the input device X 730 to transmit a control instruction to the display apparatus, the control instruction is performed on the first sub-screen 710, and the second sub-screen 720 is not affected by the control instruction at all. The second sub-screen 720 is bound to the input device Y 740, and is thus exclusively controlled by the input device Y 740.

According to various embodiments of the inventive concept, an identifier cursor of an input device may be represented differently when the identifier cursor is located within a sub-screen bound to the input device and when the identifier cursor is located within a sub-screen that is not bound to the input device. For example, as illustrated in FIG. 7, the identifier cursor 750 of the input device X 730 is displayed only when it is located within the first sub-screen 710, and may not be displayed when it is located with the second sub-screen 720. When the identifier cursor 750 of the input device X 730 is located within the second sub-screen 720, the identifier cursor 750 of the input device X 730 is hidden so as to effectively remind the user that the user has no control right for the second sub-screen 720 when the user manipulates the input device X 730. Furthermore, by hiding the identifier cursor 750 of the input device X 730 from the second sub-screen 720, a user of the input device Y 740 who is using the second sub-screen 720 is not hindered in viewing content of the second sub-screen 720 due to the identifier cursor 750 of the input device X 730.

Alternatively, when the identifier cursor 750 of the input device X 730 is located within the second sub-screen 720, the shape of the identifier cursor 750 is not disappeared but may be modified to another shape that is different from when it is located within the first sub-screen 710. For example, when the identifier cursor 750 of the input device X 730 is located within the first sub-screen 710, a typical shape of the identifier cursor (for example, the shape of a pointing cursor of a mouse) is displayed, but when the identifier cursor 750 of the input device X 730 is located within the second sub-screen 720, the identifier cursor 750 may be displayed as an X shape so as to remind the user of the input device X that the user has no control right for the second sub-screen 720.

Meanwhile, according to various embodiments of the inventive concept, whether to perform a control instruction may be determined based on a location of an identifier cursor of an input device. For example, a control instruction of the input device X 730 is performed on the first sub-screen 710 only when the identifier cursor 750 of the input device X 730 is located within the first sub-screen 710. Thus, a control instruction sent by the input device X 730 when the identifier cursor 750 of the input device X 730 is located within the second sub-screen 720 does not affect not only the second sub-screen 720 but also the first sub-screen 710.

On the contrary, an embodiment is also possible, in which every control instruction sent by an input device is performed on a sub-screen bound to the input device regardless of a location of an identifier cursor of the input device.

Figure 8:
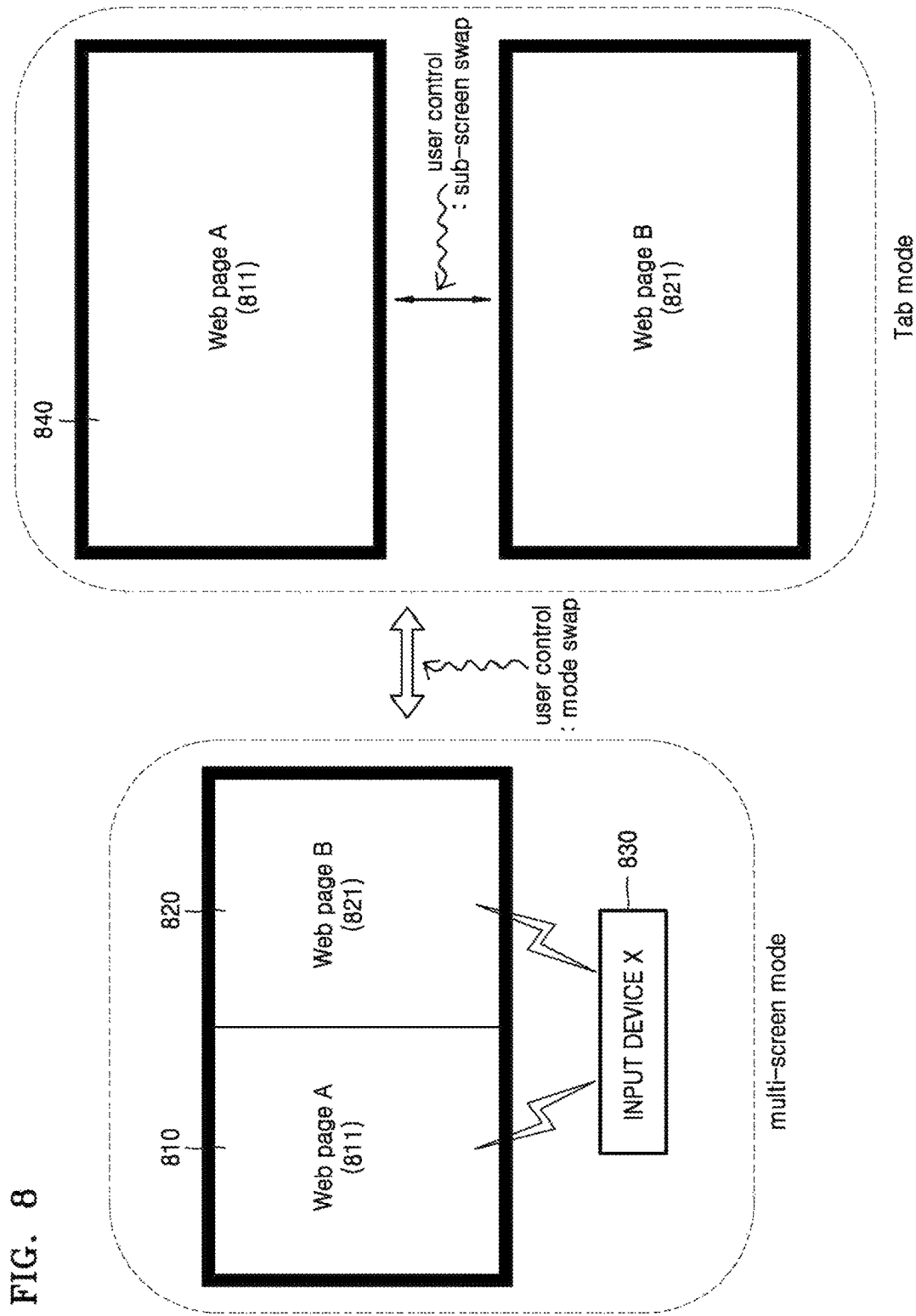
FIG. 8 is a view illustrating a method of converting a display mode between a multi-screen mode and a tab mode, according to an embodiment of the inventive concept.

FIG. 8 is a view illustrating a method of converting a display mode between a multi-screen mode and a tab mode, according to an embodiment of the inventive concept.

In a multi-screen mode, a plurality of sub-screens are simultaneously displayed on a screen of a display apparatus, and in a tab mode, only one of the sub-screens is displayed.

As illustrated in FIG. 8, two sub-screens 810 and 820 are displayed on a display apparatus in a multi-screen mode of the present embodiment. A web page A 811 is displayed on the left sub-screen 810, and a web page B 821 is displayed on the right sub-screen 820. The two sub-screens 810 and 820 are both bound to an input device X 830. For example, while a user is reading a news article provided via the web page A 811 on a smart TV in a living room, the user is listening to his or her favorite music via a music streaming service provided via the web page B 821 at the same time.

The user may easily convert a display mode of the smart TV by using the input device X 830. A button via which the display mode is converted may be implemented on the input device X 830 or within the screen.

As illustrated on the right of FIG. 8, in the tab mode, one of the sub-screens is displayed as a whole screen mode. In the above example, when the user wishes to read the news article on a larger screen, the user may convert the multi-screen mode to the tab mode so that a screen 840 of the smart TV displays only the web page A 811. Here, the other sub-screen 820 may be preferably not ended but maintain its execution state in the background. That is, since the music streaming service being used on the web page B 821 is not ended, the music being played is not interrupted. Likewise, the user may also display the web page B 821 in a whole screen mode on the screen of the display apparatus by using the input device X 830.

In the tab mode, the user may easily convert between the two sub-screens 810 and 820 displayed on the screen of the display apparatus by using the input device X 830. A button via which the sub-screens are converted between each other may also be implemented on the input device X 830 or within the screen.

Figure 9:
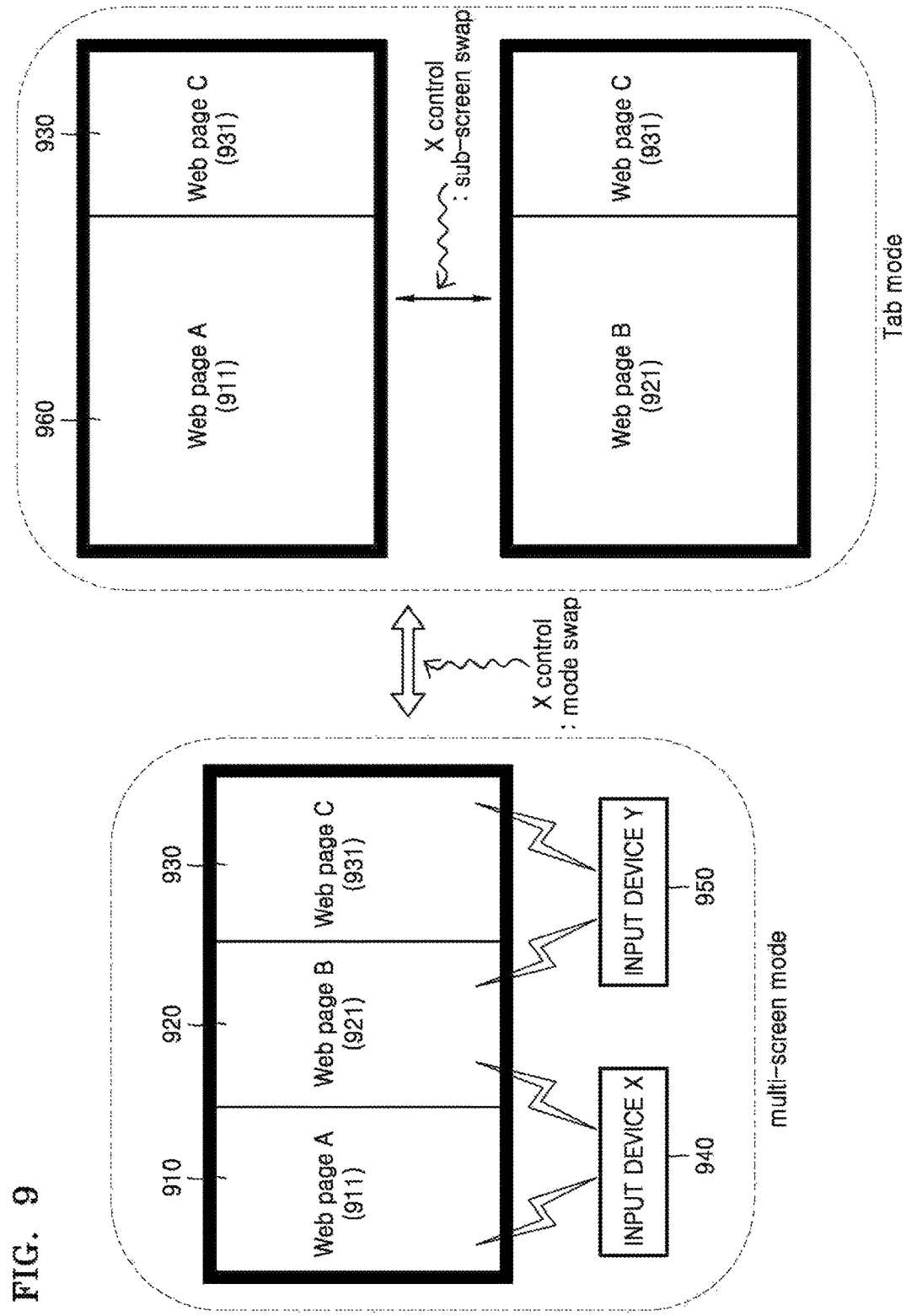
FIG. 9 is a view illustrating a method of converting a display mode between a multi-screen mode and a tab mode, according to another embodiment of the inventive concept, which is modified from the embodiment of FIG. 8.

FIG. 9 is a view illustrating a method of converting a display mode between a multi-screen mode and a tab mode, according to another embodiment of the inventive concept, which is modified from the embodiment of FIG. 8.

As illustrated in FIG. 9, three sub-screens 910, 920, 930 are displayed on a display apparatus in a multi-screen mode of the present embodiment. A web page A 911 is displayed on the left sub-screen 910, and a web page B 921 is displayed on the middle sub-screen 920, and a web page B 931 is displayed on the right sub-screen 930. The two sub-screens 910 and 920 are bound to an input device X 940, and the other sub-screen 930 is bound to an input device Y 950.

A user of the input device X 940 converts a display mode of the sub-screens 910 and 920 bound to the input device X 940 from a multi-screen mode to a tab mode by using the input device X 940. As a result, as illustrated on the right, content of only one of the two sub-screens 910 and 920 are displayed by using a single screen 960 having a size corresponding to a sum of the two sub-screens 910 and 920 bound to the input device X 940. That is, either the web page A 911 or the web page B 921 is displayed in a whole screen mode via the single screen 960 having a size corresponding to the sum of the two sub-screens 910 and 920. As described above with reference to FIG. 8, the user of the input device X 940 may convert between the web page A 911 and the web page B 921 (conversion between sub-screens) in the tab mode by using the input device X 940. A button that executes conversion between sub-screens may be implemented on the input device X 940, or in an area bound to the input device X 940, that is, within the two sub-screens 910 and 920 in the multi-screen mode and the single screen 960 in the tab mode.

Meanwhile, the sub-screen 930 bound to the input device Y 950 is independently or exclusively controlled by the input device Y 950, and thus, is not affected by display mode conversion performed by using the input device X 940.

Figure 10:
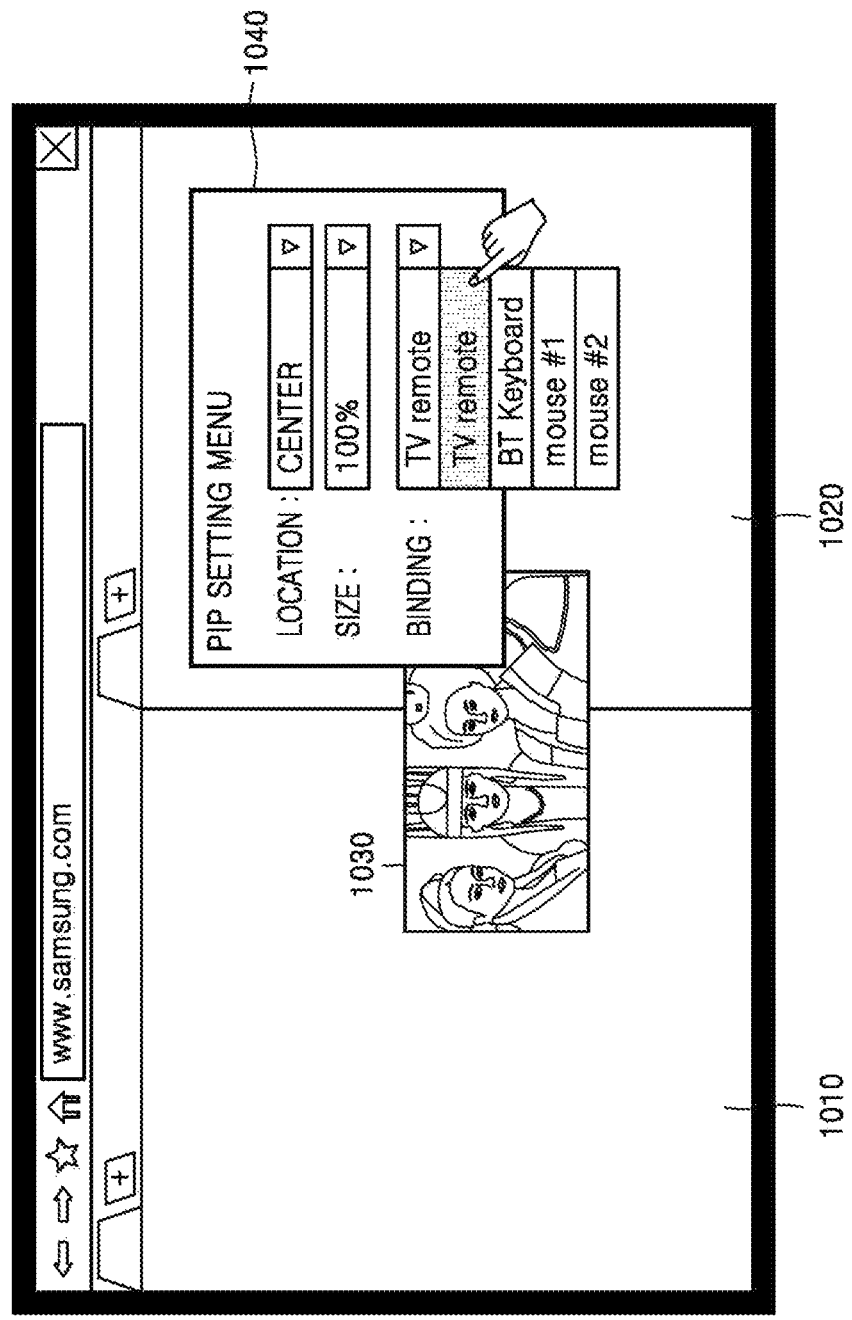
FIG. 10 illustrates a menu for setting a TV PIP window, according to an embodiment of the inventive concept.

FIG. 10 illustrates a menu for setting a TV PIP window, according to an embodiment of the inventive concept.

The TV PIP window 1030 displays broadcasting content, and may preferably be displayed in front of sub-screens 1010 and 1020 as illustrated in FIG. 10. Alternatively, a sub-screen at a location preset for the TV PIP window 1030 may be reserved, and when the TV PIP window 1030 is turned on, the TV PIP window 1030 may be placed on the reserved sub-screen so that the TV PIP window 1030 does not cover other sub-screens.

As illustrated in FIG. 10, a user may set a location and a size of the TV PIP window 1030 via a TV PIP setting menu 1040, and moreover, may also bind the TV PIP window 1030 to an input device like a sub-screen. The input device bound to the TV PIP window 1030 exclusively controls the TV PIP window 1030, and cannot control other sub-screens.

In general, a TV PIP window is used to view two channels on TV via one screen at the same time. Under such an environment, the TV PIP window displays broadcast content of one channel, and broadcast content of another channel are displayed on a background. Thus, a TV PIP window used in conventional TVs is typically located at one of four corners so that broadcast content displayed on the background are covered the least, and a size thereof cannot be modified by a user as desired.

However, in the display apparatus according to the inventive concept, a large screen of the display apparatus are used densely and in various manners via a plurality of sub-screens, and thus, a location and/or a size of the TV PIP window 1030 may have to be dynamically changed based on content displayed on each sub-screen or a usage condition of users. For example, on a sub-screen via which music is playing via a web page providing a music streaming service, from among sub-screens, contents that are visually displayed on the sub-screen do not disturb listening to music even though the contents are covered to some extent. Thus, it is efficient in terms of screen space utilization when the TV PIP window 1030 is placed over the sub-screen via which music is being played. Alternatively, when one of users of the sub-screens is currently not using a sub-screen to answer an incoming call, it is efficient for the TV PIP window 1030 to be moved over the sub-screen that is currently not being used, and moreover, to increase the size of the TV PIP window 1030 appropriately.

As described above, in order to dynamically adjust the size and the location of the TV PIP window 1030, according to various embodiments of the inventive concept, a user may change the size and the location of the TV PIP window 1030 not only via the setting menu 1040 but also via a drag input. That is, a user of an input device bound to the TV PIP window 1030 may drag and drop the TV PIP window 1030 to a desired location, by using the input device, and may also drag a rim or an edge portion of the TV PIP window to adjust a size of the TV PIP window.

Figure 11:
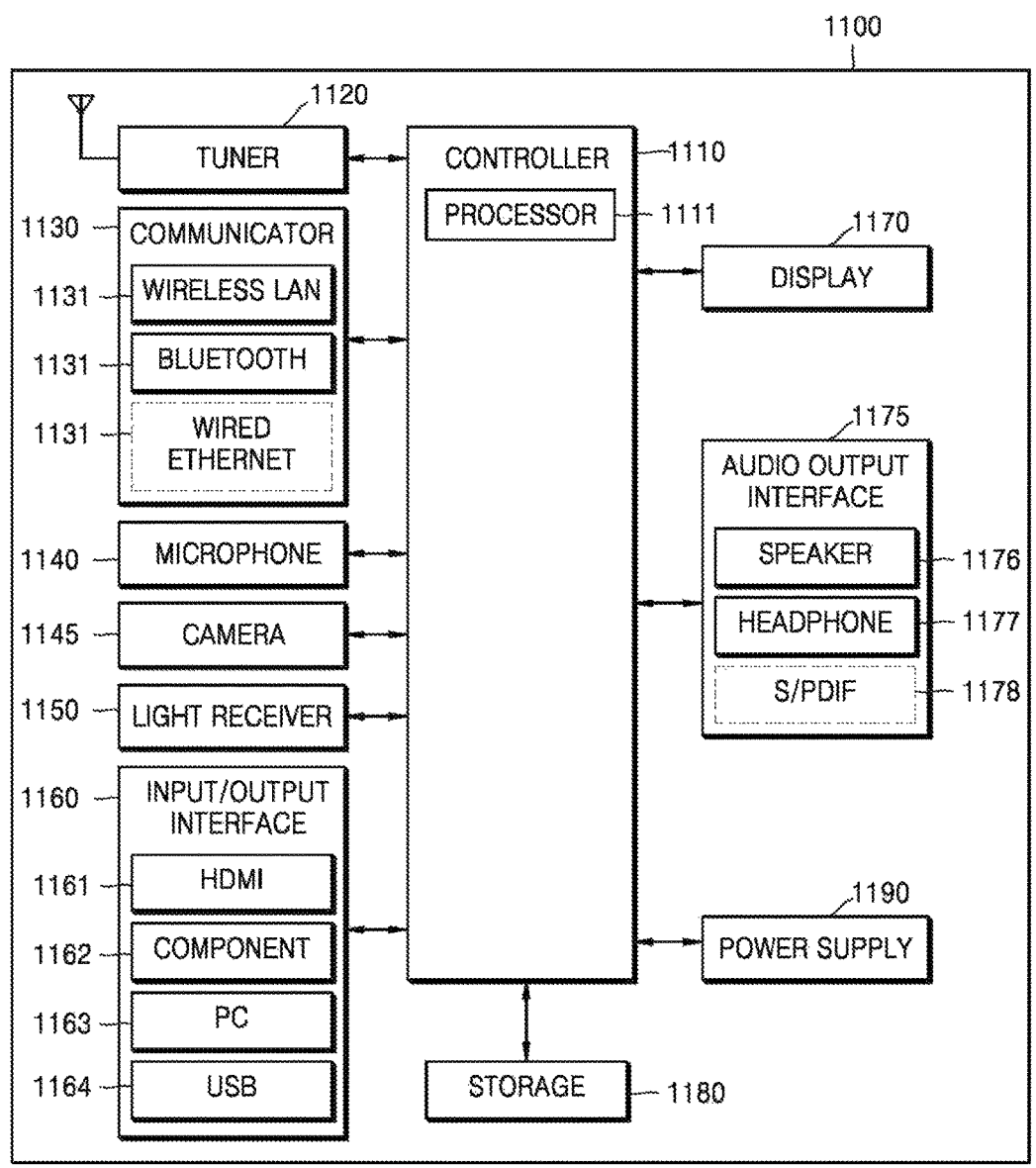
FIG. 11 illustrates a structure of a display apparatus according to an embodiment of the inventive concept.

FIG. 11 illustrates a structure of a display apparatus according to an embodiment of the inventive concept.

The display apparatus 1100 may include not only a display 1170 but also a tuner 1120, a communicator 130, and an input/output interface 1160. The display apparatus 1100 may include not only the display 1170 but also a combination of the tuner 1120, the communicator 1130, and the input/output interface 1160. Also, the display apparatus 1100 including the display 1170 may be electrically connected to an additional external device having a tuner (for example, a set-top box (not shown)). The display apparatus 1100 may be implemented, for example, by an analog TV, a digital TV, a 3D TV, a smart TV, a LED TV, an OLED TV, a plasma TV, a monitor, or the like, but those skilled in the art will easily understand that the display apparatus 1100 is not limited thereto. Also, the display apparatus 1100 includes the tuner 1120, the communicator 1130, a microphone 1140, a camera 1145, a light receiver 1150, the input/output interface 1160, the display 1170, an audio output interface 1175, a storage 1180, and a power supply 1190. The display apparatus 1100 may include a sensor (for example, an illumination sensor, a temperature sensor, or the like) (not illustrated) for detecting an internal or external state of the display apparatus 1100. It will be easily understood by those skilled in the art that some of elements of the display apparatus 1100 illustrated in FIG. 11 may be omitted based on performance and a structure of the display apparatus 1100.

A controller 1110 controls the overall operation of the display apparatus 1100 and a signal flow between internal components 1120 to 1190 of the display apparatus 1100 and performs a function of processing data. The controller 1110 controls units illustrated in FIG. 11 by executing programs stored in the storage 1180, and performs various functions of the display apparatus 1100. The programs stored in the storage 1180 may be classified as various modules based on their functions, and the modules include a sub-screen controlling module (not shown) executing a method of controlling sub-screens according to the inventive concept.

Thus, the controller 1110 controls a plurality of sub-screens displayed on the display 1170 by executing the sub-screen controlling module, according to various embodiments of the inventive concept. As one representative example, the sub-screen controlling module may bind each of a plurality of sub-screens to at least one of input devices connected in a wired or wireless manner to a display apparatus, and when a control instruction is received from the input device, the sub-screen controlling module determines a target sub-screen bound to the input device to thereby perform the control instruction on the target sub-screen independently of other sub-screens. In addition, the sub-screen control module may further include instruction used to execute the various embodiments of the inventive concept described above.

The processor 1111 may include a graphic processing unit (GPU) (not shown) for graphic processing of an image or a video. The processor 1111 may be implemented in the form of a system on chip (SoC) including a core (not shown) and the GPU (not shown). The processor 1111 may include a single core, a dual core, a triple core, a quad core, etc. The processor 1111 may include a plurality of processors. For example, the processor 1111 may be implemented by a main processor (not shown) and a sub processor (not shown) operable in a sleep mode.

The tuner 1120 may receive broadcast signals from various sources such as terrestrial broadcasting, cable broadcasting, satellite broadcasting, and Internet broadcasting. The tuner 1120 may also receive a broadcast signal from a source such as digital broadcasting or analog broadcasting. The broadcast signal received through the tuner 1120 is subjected to decoding (for example, audio decoding, video decoding, or additional information decoding) and separated into audio, a video, and/or additional information. The audio, the video, and/or the additional information after the separation may be stored in the storage 1170 according to control of the controller 1110. One or more tuners 1120 may be included in the display apparatus 1110. The tuner 1120 may be an all-in-one type with respect to the display apparatus 1100 or as an additional device having a tuner electrically connected to the display apparatus 1100 (for example, a set-top box (not shown)), or a tuner (not shown) connected to the input/output interface 1160.

The communicator 1130 may connect the display apparatus 1100 to an external device (for example, an audio device) according to control of the controller. The communicator 130 may include one of a wireless local area network (WLAN) 1131, Bluetooth 1132, wired Ethernet 1133 or a combination of the WLAN 1131, the Bluetooth 1132 and the wired Ethernet 1133. The communicator 1130 may receive a remote control signal (including a control signal) of the remote controller 50 according to control of the controller 1110. The remote control signal may be implemented in a Bluetooth scheme or a radio frequency (RF) signal scheme. The communicator 1130 may further include short-range communication (for example, NFC (Near Field Communication) (not shown), BLE (Bluetooth low energy) (not shown)).

The microphone 1140 receives a sound uttered by the user. The microphone 1140 may convert the received utterance into an electrical signal. The microphone 1140 may be implemented to be integrated with or separated from the display apparatus 1100. The separated microphone 1140 may be electrically connected to the display apparatus 1100 through the communicator 1130 or through the input/output interface 1160.

The camera 1145 receives a video (for example, a successive frame) corresponding to the user's motion including a gesture in a camera recognition range. The camera 1145 may include a lens (not shown) and an image sensor (not shown). The camera 1145 may support an optical zoom or a digital zoom by using a plurality of lenses and image processing. A recognition range of the camera 1145 may be set variously according to an angle of a camera and an ambient environment condition. When a plurality of cameras 1145 are included, a three-dimensional still image or three-dimensional motion may be received by using a second camera (not shown) adjacent to the first camera 1145 of a bezel. The camera 1145 may be implemented to be integrated with or separated from the display apparatus 1100. An additional device (not shown) including the separated camera 1145 may be electrically connected to the display apparatus 1100 through the communicator 1130 or through the input/output interface 1160.

The light receiver 1150 receives a light signal (including a control signal) received from the outside. The light receiver 1150 may receive a light signal corresponding to the user input (for example, a touch, a pressing, a touch gesture, a voice, or motion) from the outside. According to control of the controller 1110, the control signal may be extracted from the received light signal. The input/output interface 1160 receives a video (for example, a moving image or the like), audio (for example, a voice, music, or the like), additional information (for example, an EPG), and the like from the outside of the display apparatus 1100 according to control of the controller 1110. The input/output interface 1160 may include one of a high-definition multimedia interface (HDMI) port 1161, a component jack 1162, a PC port 1163, and a Universal Serial Bus (USB) port 1164. The input/output interface 160 may include a combination of the HDMI port 1161, the component jack 1162, the PC port 1163, and the USB port 1164.

The display 1170 may output broadcast content received via the tuner 1120, or digital contents input via the communicator 1130 or the input/output interface 1160 or stored in the storage 1180 according to control of the controller.

The audio output interface 1175 outputs audio included in a broadcast signal received by the tuner 1120 according to control of the controller 1110. The audio output interface 1175 may output audio (for example, a voice or sound) input through the communicator 1130 or the input/output interface 1160. In addition, the audio output interface 1175 may output audio stored in the storage 1180 according to control of the controller 1110. The audio output interface 1175 may include at least one of a speaker 1176, a headphone output port 1177, and a Sony/Philips digital interface format (S/PDIF) output port 1178 or a combination of the speaker 1176, the headphone output port 1177, and the S/PDIF output port 1178.

The storage 1180 may store various data, programs, or applications for driving and controlling the display apparatus 1100 according to control of the controller. The storage 1180 may store signals or data to be input/output in correspondence with driving of the tuner 1120, the communicator 1130, the microphone 1140, the camera 1145, the light receiver 1150, the input/output interface 1160, the display 1170, the audio output interface 1175, and the power supplier 1190. The storage 1180 may store control programs for the display apparatus 1100 and control of the controller, an application downloaded initially provided by a manufacturer or externally downloaded, a graphical user interface (GUI) related to the application, an object (for example, an image, text, an icon, a button, or the like) for providing the GUI, user information, documents, databases, or related data. Various programs stored in the storage 1180 are executed by the controller 1110 to implement various functions provided by the display apparatus 1100. In particular, a sub-screen controlling module includes instructions for controlling sub-screens according to various embodiments of the inventive concept. The storage 180 includes a ROM, a RAM, a memory card (for example, a micro Secure Digital (SD) card or a USB memory (not shown)). Also, the storage 1180 may include a nonvolatile memory, a volatile memory, a hard disk drive (HDD), or a solid state drive (SSD).

The power supply 1190 supplies power input from an external power source to the components 1120 to 1180 inside the display apparatus 1100.

Figure 12:
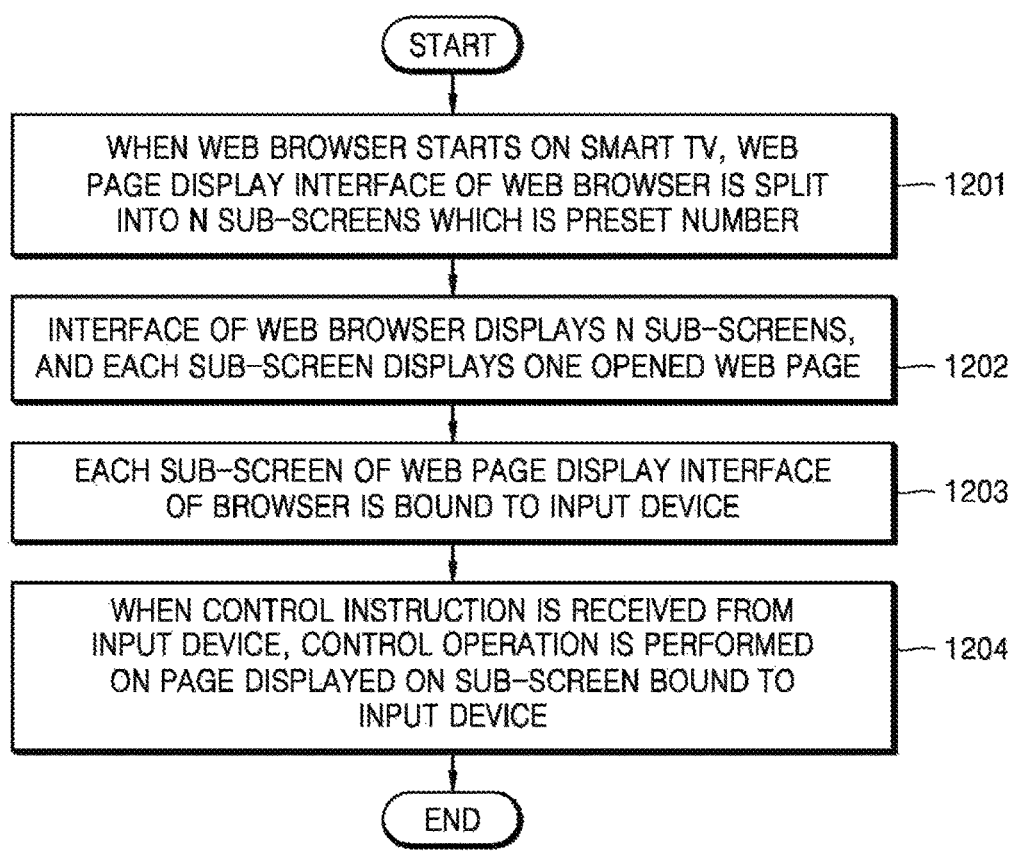
FIG. 12 is a flowchart of a method of displaying and controlling a plurality of sub-screens on a smart TV, according to an embodiment of the inventive concept.

FIG. 12 is a flowchart of a method of displaying and controlling a plurality of sub-screens on a smart TV, according to an embodiment of the inventive concept.

In operation 1201, a web browser is executed on a smart TV. An interface displaying a web page on the web browser is split into N sub-screens based on a preset number N. The number of screens N may be set by a user or according to a system default value. For example, when N is set by a user, a screen split setting menu may be displayed, and the number of screens such as 2 or 3 is set. The user may send a command to the smart TV by using a designated input device.

A layout of N sub-screens may be defined by a user or a system default layout may be used, and is not limited to a particular one. Sub-screens may be arranged horizontally or vertically, and sizes of the sub-screens may not be uniform.

In operation 1202, the web page display interface of the web browser may display N sub-screens, and each sub-screen displays one web page.

A plurality of web pages are opened via the web browser, and at the same time, are displayed on the N sub-screens of the web page display interface. In this manner, the user may simultaneously browse two or more different web pages, or may browse a web page on one sub-screen, and watch a network video on the other sub-screen.

In addition, a display mode of an interface displaying a web page may be converted between a multi-screen mode and a tab mode. In a multi-screen mode, two or more web pages are simultaneously displayed. In a tab mode, one web page may be displayed on an interface of a web browser, and other web pages may be hidden or executed on a background.

In operation 1203, an input device bound to each sub-screen of the web page display interface of the web browser is set. One of input devices connected to the smart TV is selected with respect to a sub-screen A of the web page display interface of the web browser and is bound to the sub-screen A.

The bound input device may be a TV remote controller, a touch device, a mouse or a keyboard. According to an embodiment, the one input device may be bound to one or a plurality of sub-screens. A binding operation is performed according to a user input.

In operation 1204, a control instruction is received from the input device, and a control operation is performed on a page displaying the sub-screen bound to the input device.

When a control instruction is received from a predetermined input device B, first, a sub-screen bound to the input device B is determined, and a control operation is performed according to a user instruction, on a page on the sub-screen bound to the input device B.

If the input device B is bound to only one sub-screen, a control operation is directly performed on the sub-screen bound to the input device B. For example, when a TV remote controller is bound to a sub-screen C, a control instruction sent via the TV remote controller controls only the sub-screen C. After receiving the control instruction via the TV remote controller, a TV terminal controls contents displayed on the sub-screen C to perform, for example, an operation of turning over pages. Alternatively, whether an identifier cursor displaying the input device on a TV screen is within a response area of the currently bound sub-screen is determined. If so, a control operation is performed on the bound sub-screen, and otherwise, the control instruction is not responded. For example, when a mouse is bound to the sub-screen C, and an identifier cursor displaying the mouse is not within a range of the sub-screen C, a page displayed on the sub-screen C is not responded even when the mouse operates. However, by using the first response mode, when the input device is the mouse, and when a control instruction is transmitted via the mouse regardless of whether the identifier cursor of the mouse is within a response area of the sub-screen or not, a control operation may be performed on the sub-screen bound to the mouse.

If the input device B is bound to a plurality of sub-screens, after a target sub-screen of a current operation is determined, a control operation is performed on the target sub-screen. For example, when the input device is a mouse B, and a control instruction from the mouse B is received via the TV terminal, an identifier displaying the mouse B is determined first. If a sub-screen including the identifier is bound to the mouse B, the sub-screen is determined as a target sub-screen, and a control operation is performed on the target sub-screen. Otherwise, the control instruction of the mouse B is not responded. Finally, the input device cannot control a sub-screen that is not bound to the input device.

Figure 13:
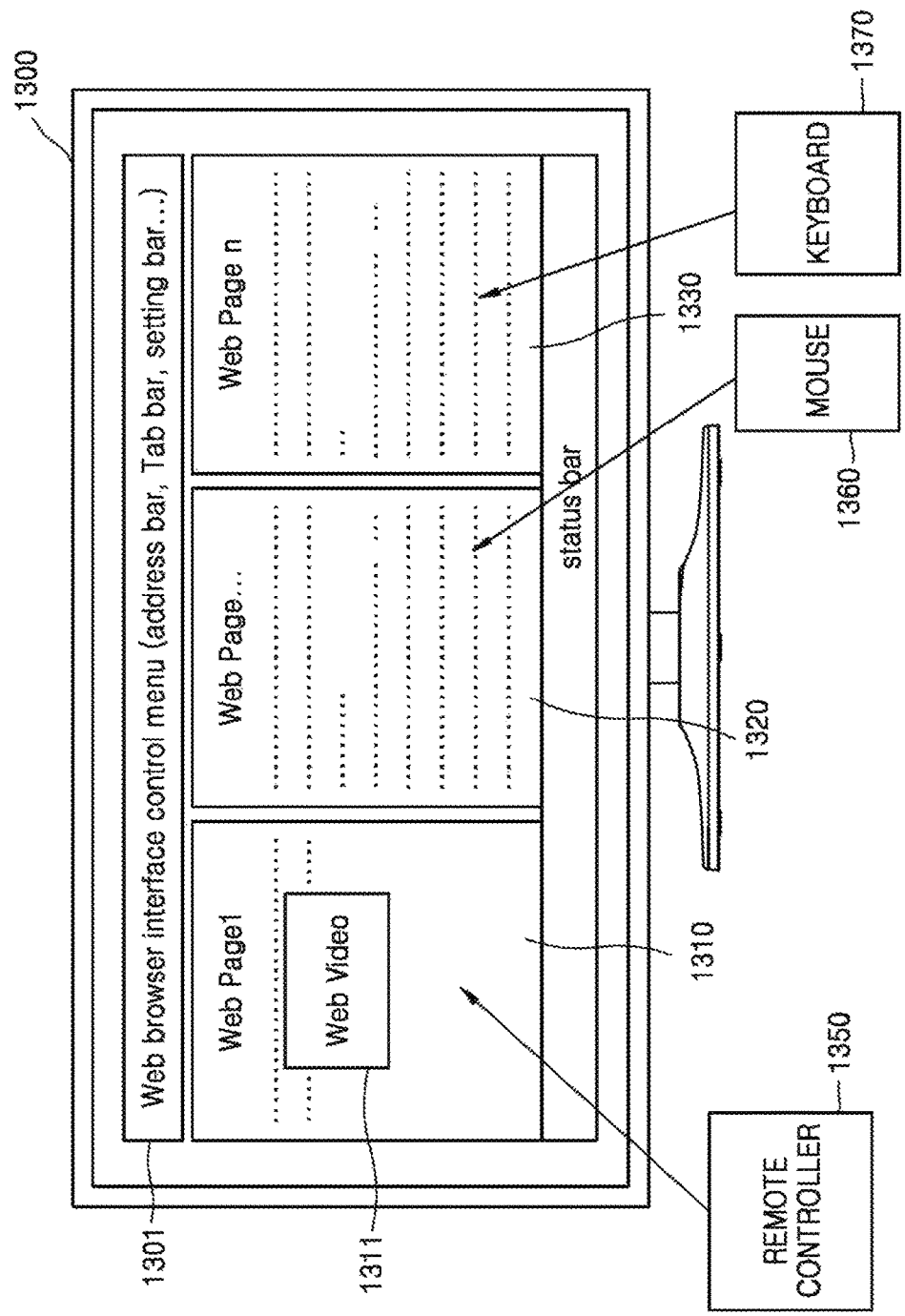
FIG. 13 is a view illustrating a method of displaying and controlling a plurality of sub-screens on a PC style web browser executed on a smart TV, according to an embodiment of the inventive concept.

FIG. 13 is a view illustrating a method of displaying and controlling a plurality of sub-screens on a PC style web browser executed on a smart TV 1300, according to an embodiment of the inventive concept.

As illustrated in FIG. 13, according to the present embodiment, a web browser including a control menu 1301 including an address window, a backward button, a forward button, a setting bar or the like, that is, a PC style web browser is used. A web page display interface of the web browser is split into n sub-screens 1310, 1320, and 1330. Each of the sub-screens 1310, 1320, and 1330 is bound to different input devices such as a remote controller 1350, a mouse 1360, or a keyboard 1370.

The leftmost sub-screen 1310 displays a web page 1 including a web video 1311, and the sub-screen 1310 is bound to the remote controller 1350. Thus, a user of the remote controller 1350 may control the web page 1 by using the remote controller 1350, and content of other sub-screens 1320 and 1330, that is, web pages 2 through n are not affected by manipulation of the remote controller 1350.

In a PC style web browser environment in which the sub-screens 1310, 1320, and 1330 share one control menu 1301 as in the present embodiment, it is to be determined which sub-screen a control instruction through the control menu 1301 is to be applied to. Preferably, a sub-screen on which a control operation is to be performed is determined based on an input device that has input a control instruction via the control menu 1301. For example, when URL (Uniform Resource Locator) is input to an address window by using the remote controller 1350, the corresponding URL is accessed on the first sub-screen 1310 bound to the remote controller 1350, and the other sub-screens 1320 and 1330 are not affected by the URL input to the address window.

Figure 14:
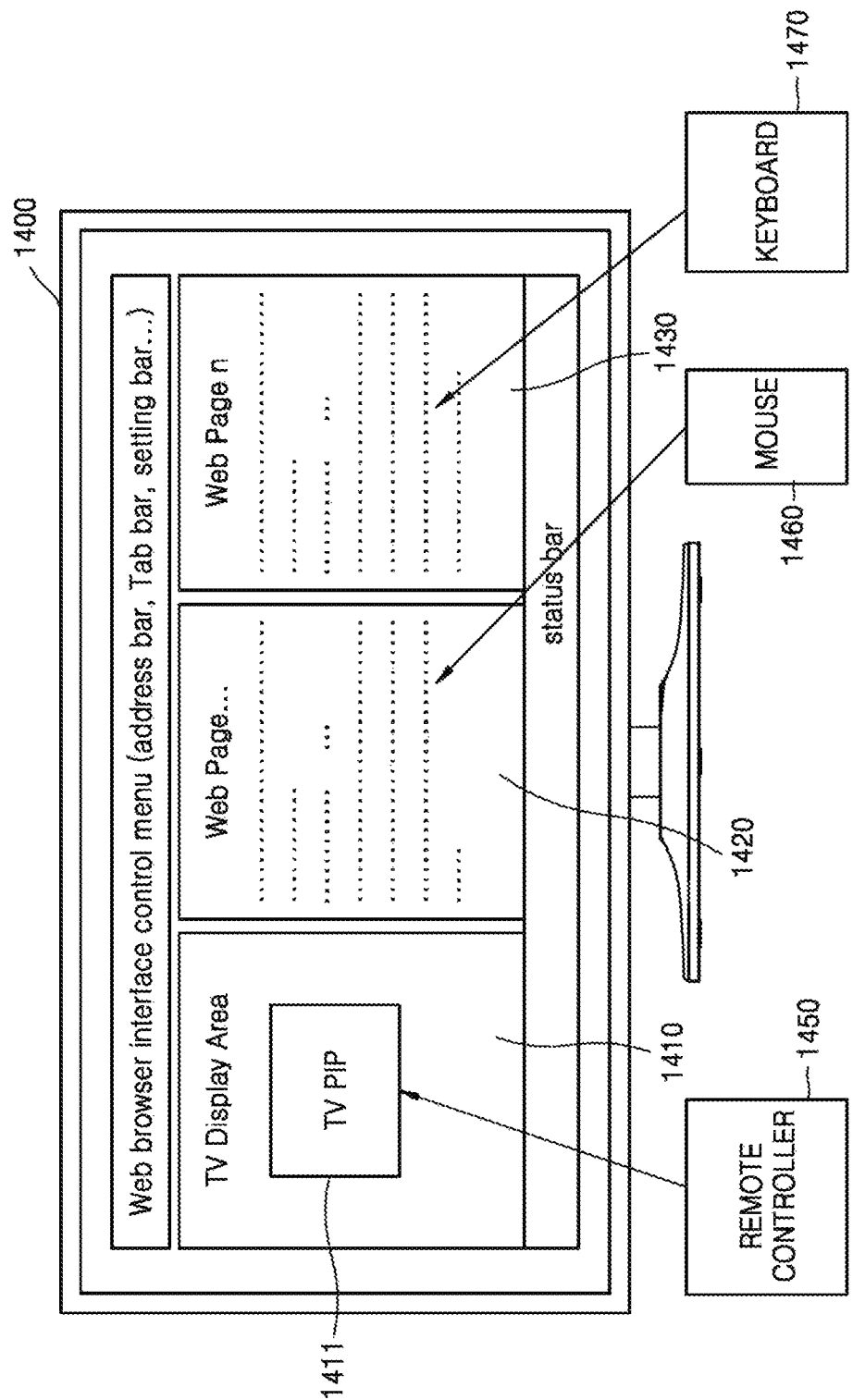
FIG. 14 is a view illustrating a method of displaying and controlling a plurality of sub-screens and a TV PIP window on a PC style web browser executed on a smart TV, according to an embodiment of the inventive concept.

FIG. 14 is a view illustrating a method of displaying and controlling a plurality of sub-screens 1410, 1420, and 1430 and a TV PIP window 1411 on a PC style web browser executed on a smart TV 1400, according to an embodiment of the inventive concept.

In order to increase diversity of contents displayed on the smart TV 1400 and satisfy increasing requirements of users, the TV PIP window 1411 may be displayed in front of a web browser, and a size and/or location of the TV PIP window 1411 may be adjusted according to a user instruction. For example, the TV PIP window 1411 may be displayed at a designated location on a certain sub-screen 1410 of a web browser interface such that users are not hindered in viewing content of a web page. Similarly to a sub-screen of the web browser, an input device 1450 bound to the TV PIP window 1411 is controlled according to a control instruction of the input device 1450. The input device bound to the TV PIP window 1411 may be a TV remote controller 1450 or other input device that can control TV programs.

The mechanisms for processing control instructions described above may also be used in controlling the TV PIP window 1411 via the input device 1450 bound to the TV PIP window 1411. For example, when a control instruction is received from the input device 1450, an embodiment is possible, in which a control operation according to the control instruction is immediately performed on the bound TV PIP window 1411, or an embodiment, in which whether to perform a control operation is determined based on a location of an identifier cursor of the input device, is possible. In the latter case, if the input device 1450 bound to the TV PIP window 1411 has an identifier cursor on a TV screen, first, a location of the identifier cursor is determined, and when the identifier cursor is located in a response area of the TV PIP window 1411, a control operation is performed on the TV PIP window 1411. If a location of the identifier cursor is not located within the response area of the TV PIP window 1411, a control instruction is not responded by the TV PIP window 1411.

Figure 15:
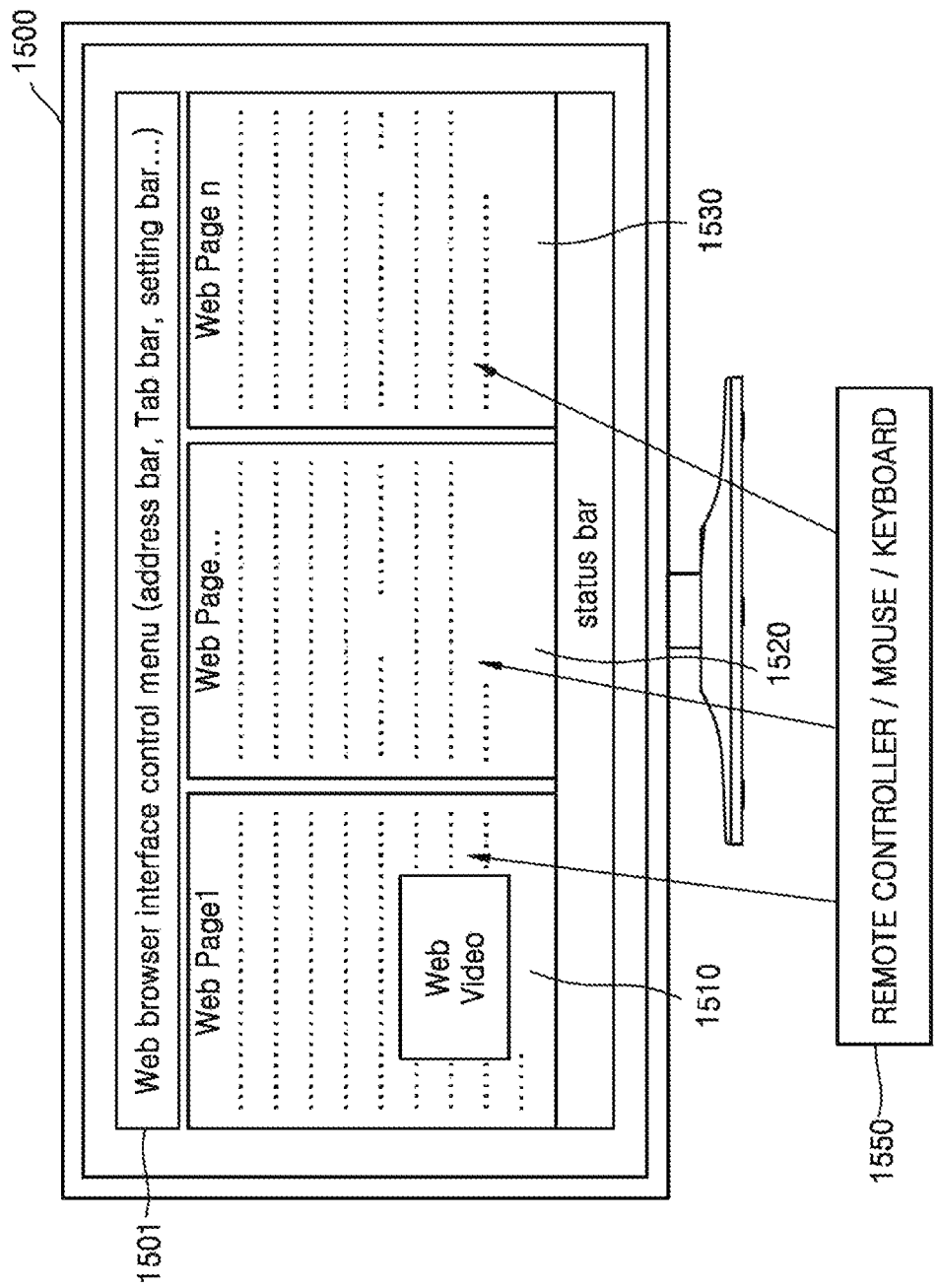
FIG. 15 is a view illustrating a method of integrally controlling a plurality of sub-screens of a PC style web browser executed on a smart TV, according to an embodiment of the inventive concept.

FIG. 15 is a view illustrating a method of integrally controlling a plurality of sub-screens 1510, 1520, and 1530 on a PC style web browser executed on a smart TV 1500, according to an embodiment of the inventive concept.

As illustrated in FIG. 15, the smart TV 1500 according to the present embodiment executes a PC style web browser having a control menu 1501, and a web page display interface of the web browser is split into n sub-screens 1510, 1520, and 1530.

The n sub-screens 1510, 1520, and 1530 are all integrally controlled. That is, whether the n sub-screens 1510, 1520, or 1530 are single or plural, they are bound to the same input device 1550. In this case, all sub-screens 1510, 1520, and 1530 may be controlled together in the same manner with respect to a control instruction of the input device 1550.

Alternatively, various selecting methods may be used to control only one of the n sub-screens 1510, 1520, and 1530 bound to the input device 1550. Preferably, a sub-screen on which an identifier cursor of the input device 1550 is currently located is determined as a target sub-screen, on which a control operation is to be performed.

Figure 16:
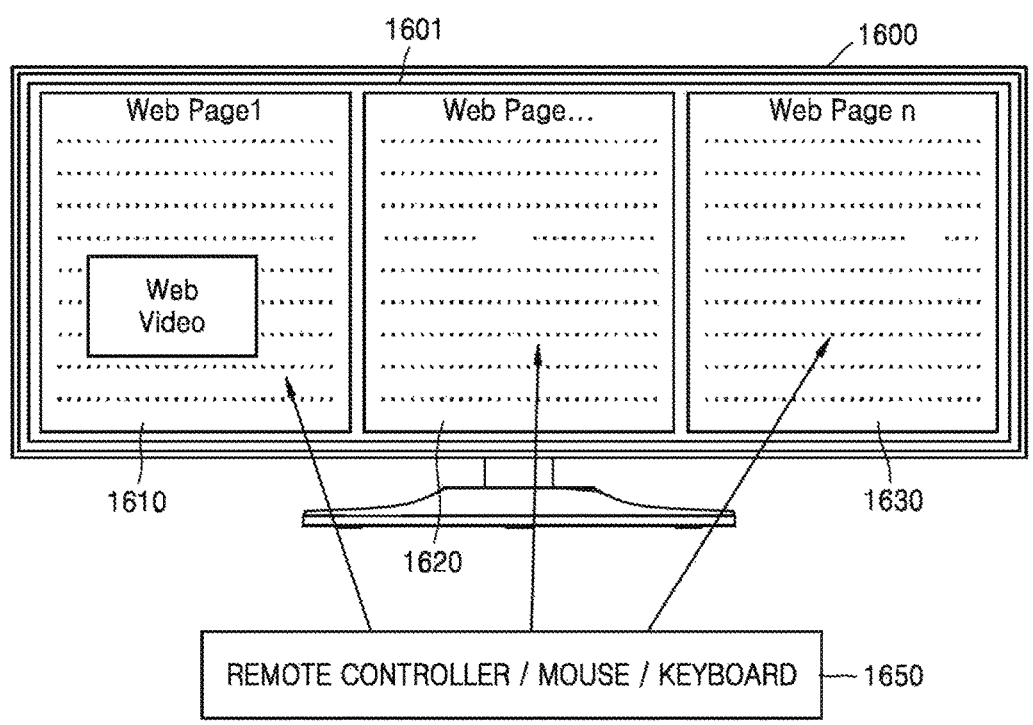
FIG. 16 is a view illustrating a method of integrally controlling a plurality of sub-screens on a content web browser executed on a smart TV, according to an embodiment of the inventive concept.

FIG. 16 is a view illustrating a method of integrally controlling a plurality of sub-screens of a content web browser executed on a smart TV 1600, according to an embodiment of the inventive concept.

Unlike a PC style web browser in a smart TV environment where manipulation of an input device is difficult, the content web browser 1601 has a broader web page display interface by omitting a control menu, a status bar, or the like. Thus, the content web browser 1601 is optimized for a smart TV. As illustrated in FIG. 16, the content web browser 1601 does not have a control menu or a status bar or the like that are shared by sub-screens, and thus, each sub-screen is broader and a user interface thereof is more orderly compared to a PC style web browser.

Although not illustrated in FIG. 16, the content web browser 1601 does not have a control menu shared by sub-screens, and thus, an address window may preferably be provided as a message box on each sub-screen so that the user may input URL within each sub-screen.

Also in the present embodiment, like in FIG. 15, all of the n sub-screens 1610, 1620, and 1630 are integrally controlled. In addition, a control operation may preferably be performed on a sub-screen on which an identifier cursor of an input device 1650 is currently located with respect to a control instruction of the input device 1650 bound to the n sub-screen 1610, 1620, and 1630.

Figure 17:
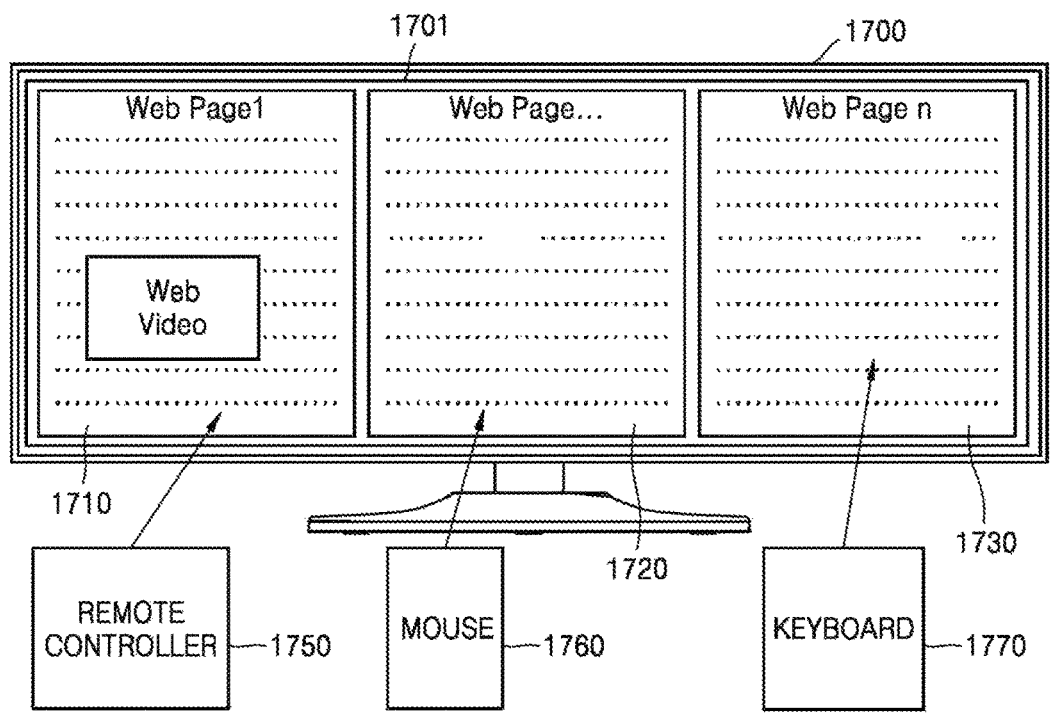
FIG. 17 is a view illustrating a method of controlling a plurality of sub-screens by using a plurality of input devices, on a content web browser executed on a smart TV, according to an embodiment of the inventive concept.

FIG. 17 is a view illustrating a method of controlling a plurality of sub-screens 1710, 1720, and 1730 by using a plurality of input devices 1750, 1760, and 1770 on a content web browser 1701 executed on a smart TV 1700, according to an embodiment of the inventive concept.

As illustrated in FIG. 17, a web page display interface of the content web browser 1701, from which a control menu and a status bar are omitted, is split into n sub-screens 1710, 1720, and 1730, and the sub-screens 1710, 1720, and 1730 are displaying different web pages from one another. The input devices 1750, 1760, and 1770 are bound to different sub-screens, and thus, a control instruction of an input device cannot control a web page of other sub-screens to which the input device is not bound. For example, even when a user who is viewing the first sub-screen 1710 controls a web video 1711 by manipulating a remote controller 1750, other web pages displayed on the other sub-screens 1720 and 1730 are not affected by a control instruction of the remote controller 1750 at all.

FIG. 18 is a view illustrating a method of converting a display mode between a multi-screen mode and a tab mode on a PC style web browser executed on a smart TV, according to an embodiment of the inventive concept.

As illustrated in FIG. 18, a user may convert a display mode between a multi-screen mode, in which a plurality of sub-screens 1820, 1830, and 1840 are simultaneously displayed, and a tab mode displaying only one sub-screen 1810 as a whole screen.

Meanwhile, in the tab mode, objects displayed on the whole screen may be sequentially converted between the sub-screens 1820, 1830, and 1840. For example, when three web pages A, B, and C are respectively displayed via three sub-screens in a multi-screen mode, and when the user presses a <display mode conversion> button, the display mode is converted to a tab mode, and the web page A is displayed on the entire screen of the smart TV. Then, every time the user presses <sub-screen conversion> of a remote controller, the screen of the smart TV is sequentially converted in the order of the web pages B, C, A, B, C, etc.

The <display mode conversion> button and/or the <sub-screen conversion> button may be implemented as hardware on an input device or as software in a screen of a smart TV.

Figure 19:
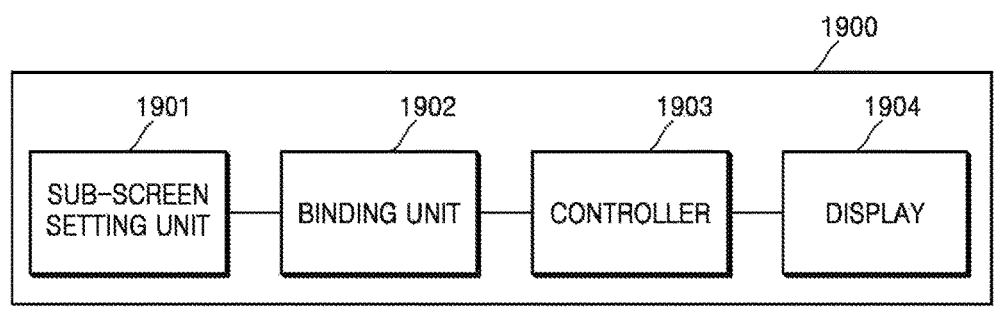
FIG. 19 is a structural block diagram of a smart TV according to an embodiment of the inventive concept.

FIG. 19 is a structural block diagram of a smart TV according to an embodiment of the inventive concept.

As illustrated in FIG. 19, the smart TV 1900 includes a sub-screen setting unit 1901, a binding unit 1902, a controller 1903, and a display 1904.

After a web browser has been executed via the smart TV 1900, the sub-screen setting unit 1901 splits a web page display interface of the web browser into N sub-screens according to a preset value.

The binding unit 1902 selects one of a plurality of input devices connected to the smart TV to bind the input device to one sub-screen. If a user appoints the same input device for all sub-screens, the input device is bound to every sub-screen. Also, the binding unit 1902 selects an input device with respect to a TV PIP window and binds the input device to the TV PIP window.

The controller 1903 receives a control instruction from the input device, and performs a control operation on a page displayed on the sub-screen bound to the input device. Also, the controller 1903 receives a control instruction from the input device bound to the TV PIP window, and performs a control operation on the TV PIP window.

The display 1904 displays a plurality of opened web pages on the N sub-screens, and displays a result of the control operation performed by using the control unit. Each sub-screen displays one opened web page. Also, a PIP window is displayed in front of the sub-screens, and adjusts a size and/or a location of the PIP window. In addition, the display 1904 displays a result of the control operation performed by the control unit on the TV PIP window.

Figure 20:
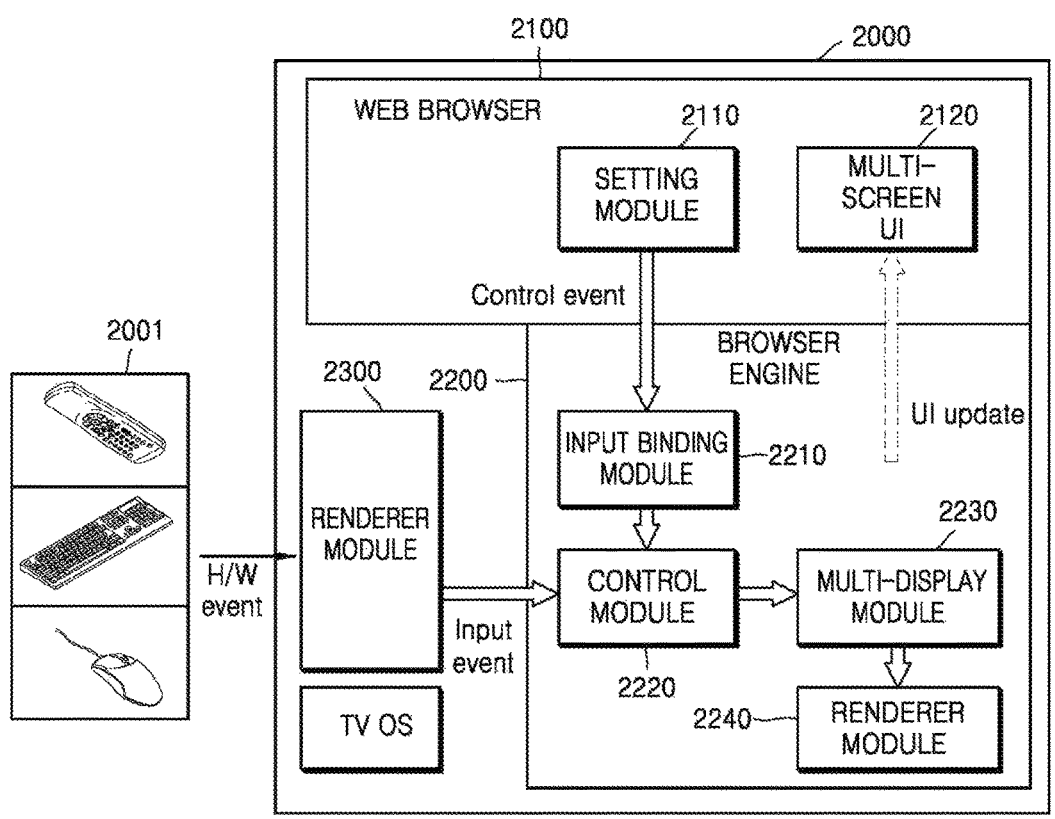
FIG. 20 is a view illustrating an operation of controlling a sub-screen on a smart TV, according to an embodiment of the inventive concept.

FIG. 20 is a view illustrating an operation of controlling a sub-screen of a web browser on a smart TV 2000, according to an embodiment of the inventive concept.

In the present embodiment, a method of displaying and controlling a sub-screen described above is implemented using a web browser core (web browser engine) interface 2200.

An electrical signal received from an input device 2001 is interpreted by a device driver 2300 installed in the smart TV 2000, and a result thereof is transmitted to the control module 2220.

In principle, when the input device 2001 sends a control instruction, the control module 2220 transmits the event to a bound sub-screen, and the control module 2220 may also prevent an input event from being applied to the bound sub-screen depending on a location of an identifier cursor of the input device 2001.

An input binding module 2210 of the web browser engine 2200 binds the input device 2001 and a sub-screen as appointed by a user, by using a setting module 2110 of the web browser 2100.

A multi-display module 2230 of the browser engine 2200 calls an interface of a renderer module 2240 of the browser engine 2200 to render a window area corresponding to sizes of different sub-screens according to the number of screens. As a user interface is updated while a rendering result is reflected in the web page display interface of the web browser 2100, a multi-screen UI 2120 displaying the plurality of sub-screens is completed.

The methods according to the embodiments of the inventive concept may be realized in a program instruction format that may be executed by using diverse computing means, so as to be recorded on a computer-readable medium. Herein, the computer-readable medium may independently include a program instruction, a data file, a data structure, and so on, or may include a combination of the same. For example, the computer-readable medium may be stored in a volatile or nonvolatile memory or in a storage device, to which data is optically or magnetically recordable and which is computer-readable, such as a compact disk (CD), a digital versatile disk (DVD), a magnetic disk, or a magnetic tape.

While this inventive concept has been particularly shown and described with reference to exemplary embodiments thereof, it will be understood by those of ordinary skill in the art that various changes in form and details may be made therein.

Therefore, the scope of the inventive concept is defined not by the described exemplary embodiments but by the appended claims and any equivalent ranges thereto.

The invention claimed is:

1. A method of controlling a display of a display apparatus, the method comprising:
   binding each of a plurality of sub-screens displayed on the display of the display apparatus to at least one of input devices configured to provide input to the display apparatus;
   in response to receiving the input comprising a control instruction with respect to the display apparatus, determining a target sub-screen that is bound to an input device of the input devices that has transmitted the control instruction, from among the plurality of sub-screens; and
   performing the control instruction for the determined target sub-screen, independently of other sub-screens,
   wherein the binding comprises displaying, on the display of the display apparatus, a binding menu including a number of the plurality of sub-screens to be displayed on the display and for each sub-screen of the plurality of sub-screens to be displayed on the display, a list of the input devices to be bound with each sub-screen, the binding menu configured to receive a first user input to select at least one input device from the list of the input devices displayed on the display to bind the at least one input device with a sub-screen of the plurality of sub-screens.

2. The method of claim 1, wherein the binding further comprises
setting the at least one input device selected by the first user input, as an input device having an exclusive control over the sub-screen bound to the at least one input device selected by the first user input.

3. The method of claim 1, further comprising displaying a menu for setting number of sub-screens,
   wherein the number of sub-screens is determined according to a second user input received via the menu.

4. The method of claim 1, wherein the determining of the target sub-screen comprises, when the plurality of sub-screens are bound to a first input device, determining, as the target sub-screen, the sub-screen, on which an identifier cursor is located, from among the plurality of sub-screens bound to the first input device, the identifier cursor indicating a location to which a command from the first input device is to be input within a screen of the display apparatus.

5. The method of claim 1, further comprising, when the plurality of sub-screens are bound to the at least one of the input devices, performing, according to a second user input from the input device, conversion between a multi-screen mode displaying all of the plurality of sub-screens bound to the at least one of the input devices and a tab mode displaying content of only one of corresponding sub-screens on a single screen having a size corresponding to a sum of the sub-screens bound to the at least one of the input devices.

6. The method of claim 1, further comprising:
   binding a television (TV) picture in picture (PIP) window displaying broadcast content, to an input device selected by a user from among input devices connected to the display apparatus; and
   controlling the TV PIP window independently of the plurality of sub-screens according to a control instruction from the selected input device,
   wherein the TV PIP window is displayed in front of the plurality of sub-screens.

7. The method of claim 6, wherein the controlling the TV PIP window comprises changing a size or a location of the TV PIP window according to a second user input of dragging the TV PIP window.

8. The method of claim 1, wherein an identifier cursor indicating a location to which a command of the input device is to be input within a screen of the display apparatus, is displayed only within the sub-screen bound to the at least one input device, and is not displayed in a sub-screen not bound to the at least one input device.

9. The method of claim 1, wherein the plurality of sub-screens independently display execution screens of different applications from one another.

10. A non-transitory computer-readable recording medium having recorded thereon a program for executing the method of claim 1.

11. A display apparatus comprising:
   a display configured to display a plurality of sub-screens;
   at least one memory configured to store a program controlling the plurality of sub-screens; and
   a controller configured to execute the program stored in the at least one memory,
   wherein the program comprises instructions for executing operations comprising:
      binding each of the plurality of sub-screens displayed on the display to at least one of input devices configured to provide input to the display apparatus;
      in response to receiving the input comprising a control instruction, determining a target sub-screen bound to an input device of the plurality of input devices that has transmitted the control instruction, from among the plurality of sub-screens; and performing the control instruction for the determined target sub-screen independently of other sub-screens, wherein the binding comprises displaying a binding menu including a number of the plurality of sub-screens to be displayed on the display and for each sub-screen of the plurality of sub-screens to be displayed on the display, a list of the input devices to be bound with each sub-screen, the binding menu configured to receive a first user input to select at least one input device from the list of the input devices displayed on the display device to bind the at least one input device with a sub-screen of the plurality of sub-screens.

12. The display apparatus of claim 11, wherein the binding further comprises:

setting the at least one input device selected by the first user input, as an input device having an exclusive control over the sub-screen bound to the at least one input device selected by the first user input.

13. The display apparatus of claim 11, wherein the program further comprises instructions for executing an operation of displaying a menu for setting number of sub-screens, wherein the number of sub-screens is determined according to a second user input received via the menu.

14. The display apparatus of claim 11, wherein the instructions for executing the operation of determining the target sub-screen comprise, when the plurality of sub-screens are bound to a first input device, instructions for executing an operation of determining, as the target sub-screen, the sub-screen, on which an identifier cursor is located, from among the plurality of sub-screens bound to the first input device, the identifier cursor indicating a location to which a command from the first input device is to be input within a screen of the display apparatus.

15. The display apparatus of claim 11, wherein the program further comprises, when the plurality of sub-screens are bound to the at least one of the input devices, instructions for executing an operation of performing, according to a second user input via the input device, conversion between a multi-screen mode displaying all of the plurality of sub-screens bound to the at least one of the input devices and a tab mode displaying content of only one of corresponding sub-screens by using a single screen having a size corresponding to a sum of the sub-screens bound to the at least one of the input devices.

16. The display apparatus of claim 11, wherein the program further comprises instructions for executing operations comprising:

binding a television (TV) picture in picture (PIP) window displaying broadcast content, to an input device selected by a user from among the input devices connected to the display apparatus; and controlling the TV PIP window independently of the plurality of sub-screens according to a control instruction from the selected input device, wherein the TV PIP window is displayed in front of the plurality of sub-screens.

17. The display apparatus of claim 16, wherein the instructions for executing the operation of controlling the TV PIP window comprise changing a size or a location of the TV PIP window according to a second user input of dragging the TV PIP window.

18. The display apparatus of claim 11, wherein an identifier cursor, which is an indicator indicating a location to which a command of the input device is to be input within a screen of the display apparatus, is displayed only within the sub-screen bound to the at least one input device, and is not displayed in a sub-screen not bound to the input device.

19. The display apparatus of claim 11, wherein the plurality of sub-screens independently display execution screens of different applications from one another.

20. The method of claim 1, wherein the plurality of sub-screens are generated by splitting a web browser displayed on the display apparatus.

21. The display apparatus of claim 11, wherein the plurality of sub-screens are generated by splitting a web browser displayed on the display apparatus.

* * * * *